United States Patent
Hongo et al.

(10) Patent No.: US 7,547,868 B2
(45) Date of Patent: Jun. 16, 2009

(54) OPTICAL NEAR-FIELD GENERATING APPARATUS AND METHOD AND INFORMATION RECORDING AND REPRODUCING APPARATUS

(75) Inventors: Kazuhiro Hongo, Kanagawa (JP); Tetsu Watanabe, Tokyo (JP)

(73) Assignee: Sony Corporation (JP)

( * ) Notice: Subject to any disclaimer, the term of this patent is extended or adjusted under 35 U.S.C. 154(b) by 18 days.

(21) Appl. No.: 12/007,854

(22) Filed: Jan. 16, 2008

(65) Prior Publication Data

US 2008/0191122 A1 Aug. 14, 2008

(30) Foreign Application Priority Data

Feb. 8, 2007 (JP) ............... 2007-029796

(51) Int. Cl.
*G11B 5/02* (2006.01)
*G11B 9/12* (2006.01)
*G11B 11/24* (2006.01)
*G11B 13/08* (2006.01)

(52) U.S. Cl. ............... 250/201.5; 250/552; 369/13.33; 369/112.27

(58) Field of Classification Search ............... 250/201.5, 250/227.24, 227.28, 552; 369/13.29–13.33, 369/112.01, 112.09, 112.37
See application file for complete search history.

(56) References Cited

U.S. PATENT DOCUMENTS 6,700,856 B2 * 3/2004 Ueyanagi ............... 369/112.23
6,782,179 B2 * 8/2004 Bozhevolnyi et al. ....... 385/131
7,227,643 B2 * 6/2007 Saeki ............... 356/445
7,279,253 B2 * 10/2007 Yamada et al. ............... 430/5
7,489,597 B2 * 2/2009 Miyanishi et al. ......... 369/13.33
2001/0009541 A1 * 7/2001 Ueyanagi ............... 369/112.23
2004/0125704 A1 * 7/2004 Ishi et al. ............... 369/13.05
2006/0075417 A1 * 4/2006 Miyanishi et al. ............ 720/658
2007/0109919 A1 * 5/2007 Yokoyama et al. ....... 369/13.24
2008/0080039 A1 * 4/2008 Hongo et al. ............... 359/237
2008/0191122 A1 * 8/2008 Hongo et al. ............ 250/201.5
2009/0067028 A1 * 3/2009 Kawata et al. ............... 359/238

FOREIGN PATENT DOCUMENTS

JP 2003-114184 4/2003

* cited by examiner

*Primary Examiner*—John R Lee
(74) *Attorney, Agent, or Firm*—Rader Fishman & Grauer PLLC; Ronald P. Kananen

(57) ABSTRACT

An optical near-field generating apparatus includes a conductive scatterer causing an optical near-field based on a surface plasmon to be generated by being illuminated by incident light, and a conductive body arranged in a vicinity of the scatterer and generating a surface plasmon by being illuminated by the incident light and by being influenced by the surface plasmon of the scatterer. An oscillation direction of the surface plasmon of the conductive body is approximately parallel to an oscillation direction of the surface plasmon of the scatterer, and a generation region of the surface plasmon of the conductive body exists in a position deviated from a region extending in an oscillation direction of the surface plasmon of the scatterer.

21 Claims, 18 Drawing Sheets

OPTICAL NEAR-FIELD GENERATING APPARATUS AND METHOD AND INFORMATION RECORDING AND REPRODUCING APPARATUS

CROSS REFERENCES TO RELATED APPLICATIONS

The invention contains subject matter related to Japanese Patent Application JP 2007-029796 filed in the Japanese Patent Office on Feb. 8, 2007, the entire contents of which being incorporated herein by reference.

BACKGROUND OF THE INVENTION

1. Field of the Invention

The invention relates to an optical near-field generating apparatus generating an optical near-field by illuminating a light to a scatterer composed of a conductive material, a method of generating an optical near-field, and an information recording and reproducing apparatus.

2. Description of the Related Art

Recently, as a method of forming a minute optical spot exceeding a diffraction limit of a light, use of a local electromagnetic field called an optical near-field is drawing attention. For example, in the field of an information recording apparatus, heat assisting electromagnetic recording using a minute optical spot formed by using the optical near-field is getting attention as a promising technology for next-generation high-density magnetic recording. This heat assisting electromagnetic recording technology enables magnetic recording to a magnetic recording medium resistant to heat fluctuation and having a high coercivity. Specifically, a light is condensed to the surface of a magnetic recording medium to locally raise the temperature of the magnetic recording medium. In the portion of the magnetic recording medium where the temperature has been raised, the coercive force of the magnetic recording medium decreases and thereby magnetic recording with a standard magnetic head becomes possible. To attain high-density magnetic recording, the size of a condensed optical spot needs to be made smaller, and a technology using the optical near-field exceeding a diffraction limit of a light has been devised. As a method of realizing a minute condensed optical spot using the optical near-field, a method using a surface plasmon resonance of a metal scatterer is available, and various studies are being made because the structure of the scatterer has a great effect on the condensing efficiency and the optical spot size of a light.

Referring to FIG. 1, description is made with respect to an example of a method of realizing a minute condensed optical spot using the surface plasmon resonance of a metal scatterer. As illustrated in FIG. 1, on a flat surface of a substrate 401, which is generally made of an optically transparent material, a scatterer 410 made of a conductive metal in a rod-like shape is formed. A surface plasmon can be excited on the scatterer 410 by arranging the scatterer 410 such that the longitudinal direction of the scatterer 410 and the polarizing direction of a propagating light Li illuminated to the scatter 410 agree with each other and by appropriately selecting the longitudinal length of the scatterer 410 to meet conditions for causing a surface plasmon to be excited.

If the propagating light Li is illuminated from the side of the substrate 401 to the scatterer 410 arranged to meet the appropriate conditions as described above, as illustrated in FIG. 2 which is a section diagram at a broken line in FIG. 1, in a light reception surface 410d of the scatterer 410, to which the propagating light Li is illuminated, and in a light emerging surface 410e, which is on the opposite side of the light reception surface 410d and which opposes an illuminated body 450 to which an optical near-field is illuminated, a charge bias is caused by an electric field of the incident propagating light Li. The oscillation of this charge bias is the surface plasmon, and if the resonant wavelength of the surface plasmon and the wavelength of the incident light Li agree with each other, it becomes a resonant condition called the surface plasmon resonance, and the scatterer 410 becomes an electric dipole strongly polarized in the direction corresponding to the polarizing direction of the incident propagating light Li, indicated by an arrow P in FIG. 2. Then, large electromagnetic fields are generated in the vicinity of both ends in the longitudinal direction of the scatterer 410, and an optical near-field Ln is generated. As illustrated in FIG. 2, the optical near-field Ln is generated in both of the light reception surface 410d and the light emitting surface 410e of the scatterer 410, however, respective optimum resonance wavelengths are different depending on the materials and the shapes of surrounding structures. When illumination of an optical near-field to the illuminated body 450 such as an information recording/reproducing medium, etc. is considered, the shapes of the surrounding structures may be adjusted so that the optical near-field in the light reception surface 410e is stronger.

By adopting the above-described method, an optical near-field with a minute optical spot can be generated from a propagating light; however, it is desirable that the conversion efficiency from the propagating light to the optical near-field is high. This is because that if the conversion efficiency is high, the power of a light emitting source such an LD, etc. that may be required for obtaining a desired power of the optical near-field can be suppressed to contribute to decreasing the power consumption and size of an optical near-field generating apparatus. Further, when the light of the light emitting source is condensed with a condensing element to be illuminated, it is possible to use a condensing element with a relatively low numeric aperture, and optical adjustment becomes considerably simple as compared with a case that a condensing element with a relatively high numeric aperture may be required, so that the yield of apparatuses can be raised.

To obtain high conversion efficiency, Japanese Unexamined Patent Application Publication No. 2003-114184, for example, discloses technology to make a scatterer in such a shape that the width of the scatterer is decreased toward a tip end part thereof where an optical near-field is generated, e.g., a plane triangular shape. The application also discloses technology to use two scatterers each in such a shape that the width decreases and to arrange the scatterers such that the narrowed tip end parts thereof come close to each other to further increase the optical near-field to be generated.

SUMMARY OF THE INVENTION

As described in the above-described JP Publication, to realize the shape that the width of a scatterer is decreased toward a portion where an optical near-field is generated, generally because the size of the scatterer is very small such as to be equal to or smaller than the wavelength of incident light, depending on the place where the scatterer is desired to be formed and the process condition, there is a case that it is difficult to bring the shape of the scatterer close to an optimum shape. Further, as described above, in order to realize higher conversion efficiency using a pair of scatterers with narrowed tip end parts (where an optical near-field is generated) and arranging the narrowed tip end parts thereof close to each other, the gap between the tip end parts needs to be several 10 nm or less. Accordingly, there is a problem that manufacture of the scatterers becomes very difficult and putting the scatterers into high-volume production is very difficult.

Thus, there may be a need for efficiently generating an optical near-field without depending on the shape of a scatterer.

According to an embodiment of the invention, there is provided an optical near-field generating apparatus including a conductive scatterer causing an optical near-field based on a surface plasmon to be generated by being illuminated by incident light, and a conductive body arranged in a vicinity of the scatterer and generating a surface plasmon by being illuminated by the incident light and by being influenced by the surface plasmon of the scatterer. An oscillation direction of the surface plasmon of the conductive body is approximately parallel to an oscillation direction of the surface plasmon of the scatterer, and a generation region of the surface plasmon of the conductive body exists in a position deviated from a region extending in an oscillation direction of the surface plasmon of the scatterer.

According to another embodiment of the invention, an optical near-field generation method is provided. The method includes the step of arranging a scatterer causing an optical near-field based on a surface plasmon to be generated by being illuminated by incident light and a conductive body having an edge portion that is approximately parallel to a polarizing direction of the incident light illuminated to the scatterer such that the edge portion of the conductive body is approximately parallel to the polarizing direction of the incident light and is in a position deviated from a region extending in an oscillation direction of the surface plasmon on the scatterer. The method further includes the step of causing a surface plasmon to be generated along the edge portion of the conductive body to amplify an intensity of the optical near-field generated in the scatterer as compared with a case that the conductive body is not arranged.

According to still another embodiment of the invention, an information recording and reproducing apparatus includes a light source, a scatterer opposing an information recording medium, and an optical system guiding an emerging light from the light source to the scatterer. An optical near-field generated from the scatterer is illuminated to a predetermined place of the information recording medium to carry out recording and/or reproducing. A conductive body generating a surface plasmon by being illuminated by incident light and by being influenced by a surface plasmon of the scatterer is arranged in the vicinity of the scatterer. An oscillation direction of the surface plasmon of the conductive body is approximately parallel to an oscillation direction of the surface plasmon of the scatterer, and a generation region of the surface plasmon of the conductive body exists in a position deviated from a region extending in an oscillation direction of the surface plasmon of the scatterer.

As described above, in the optical near-field generating apparatus and method and the information recording and reproducing apparatus according an embodiment of the invention, a conductive body is arranged in the vicinity of a scatterer. A surface plasmon resonance is excited on the surface of the scatterer upon receiving incident light and thereby an optical near-field is generated and at the same time, on the surface opposing the scatterer of the conductive body, by being illuminated by the incident light and by being influenced by the surface plasmon on the scatterer, a surface plasmon is generated. In particular, the oscillation direction of the surface plasmon occurring on the surface of the conductive body is approximately parallel to the oscillation direction of the surface plasmon on the scatterer, and the generation region of the surface plasmon of the conductive body exists in a position deviated from the region extending in the oscillation direction of the surface plasmon occurring on the scatterer.

When a conductive body is arranged in the vicinity of a scatterer as described above, in both ends in the resonance direction of the scatterer, a strong optical near-field is generated as compared with a case that a conductive body is not provided, and in the surface opposing the scatterer of the conductive body, a relatively weak optical near-field is generated in a broad area as compared with the scatterer.

It is believed that this is because of the following reason. Generally, a surface plasmon may not be excited on a conductive body only by illumination of a light, however, when a scatterer generating a relatively strong optical near-field is arranged in the vicinity of the conductive body, the charge phase distribution on the surface of the conductive body is also influenced in the form of coupling by the strong optical near-field on the surface of the scatterer to be determined. Therefore, under a certain condition, the surface plasmon is excited on the surface of the conductive body. As a result, the energy of the incident light is converted into the surface plasmons on the surfaces of the scatterer and the conductive body, and because those surface plasmons are electro-magnetically coupled with each other, the intensity of the optical near-field being generated on the surface of the scatterer is increased.

Accordingly, according to an embodiment of the invention, without complicating the shape configuration of the scatterer itself, that is, without complicating the manufacture of the scatterer, by arranging a conductive body in the vicinity of the scatterer under an appropriate condition, it becomes possible to surely increase the intensity of an optical near-field to be generated on the surface of the scatterer, as compared with a case that the conductive body is not provided.

According to the optical near-field generating apparatus, the optical near-field generating method and the information recording/reproducing apparatus according to embodiments of the invention, it becomes possible to easily generate a relatively highly efficient optical near-field without depending on the shape of the scatterer.

DESCRIPTION OF THE PREFERRED EMBODIMENTS

Examples of embodiments of the invention will be described below with reference to drawings. However, the invention is not limited to the following examples.

Figure 1:
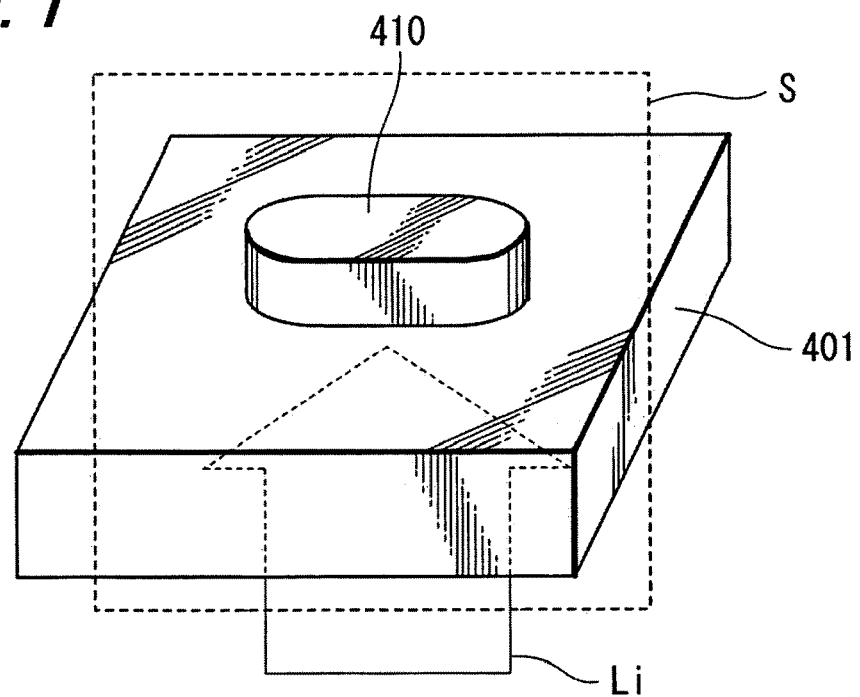
FIG. 1 is a schematic perspective configuration view of an example of a scatterer of related art.
Figure 2:
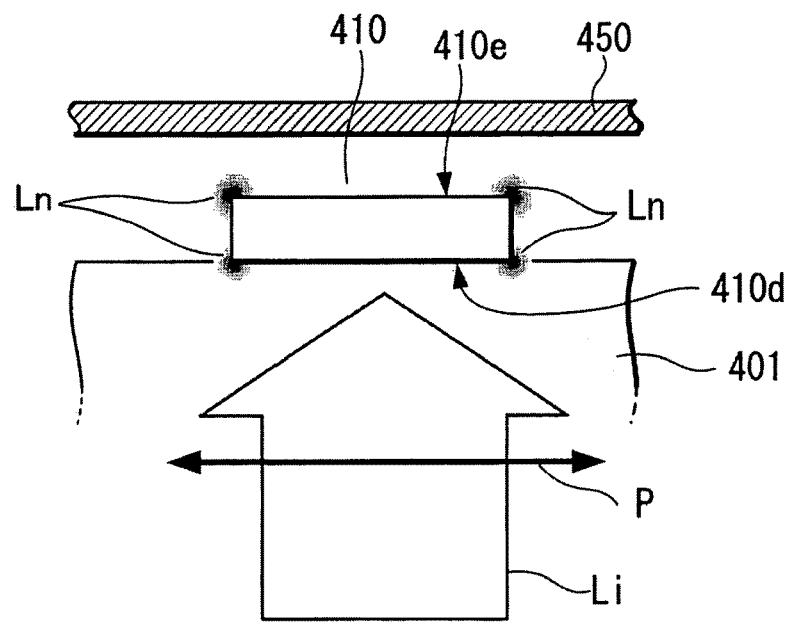
FIG. 2 is a schematic configuration view for explaining the principle of generation of an optical near-field using a related art scatterer.
Figure 3:
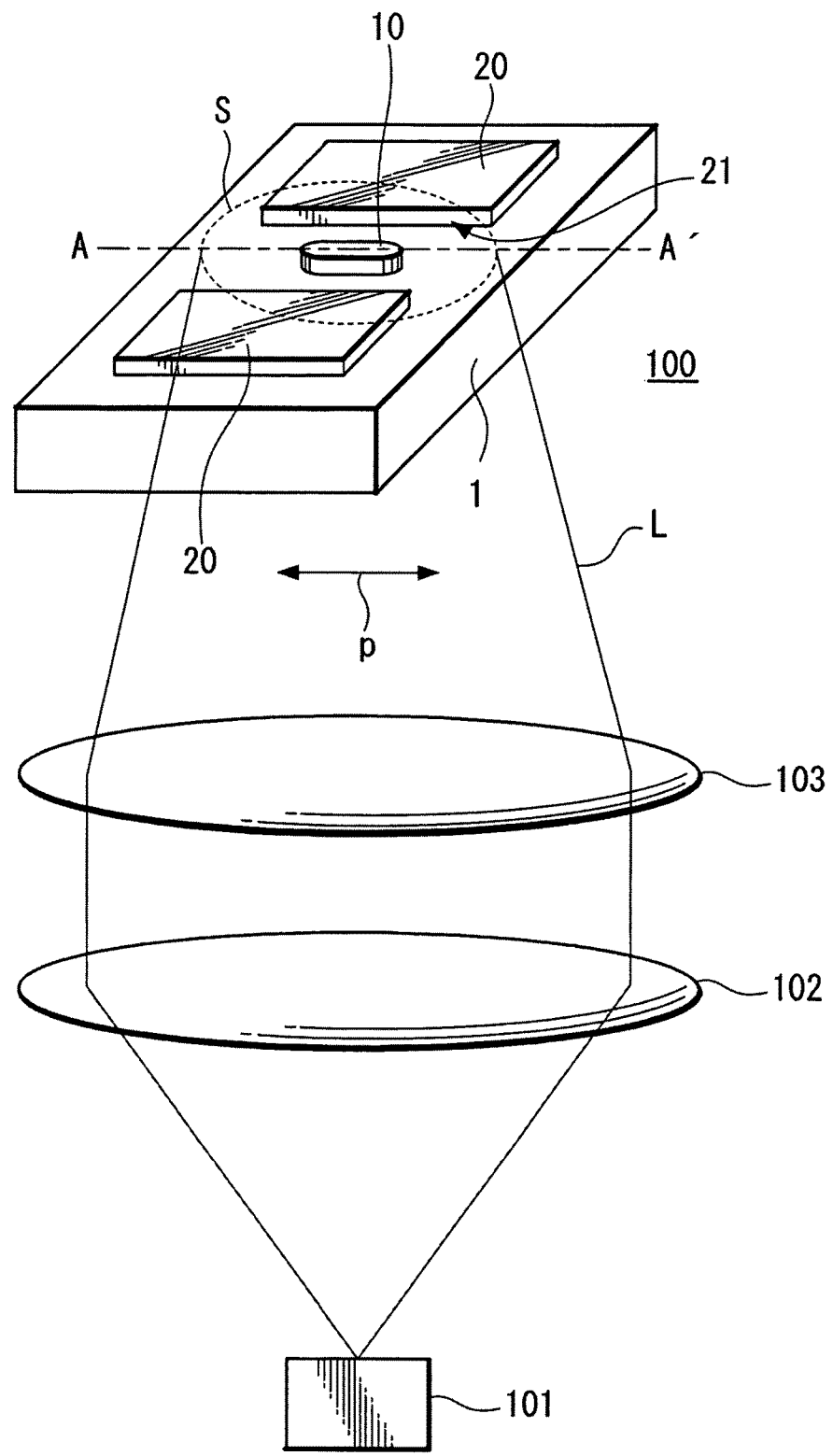
FIG. 3 is a schematic perspective configuration view of an example of an optical near-field generating apparatus according to an embodiment of the invention.

FIG. 3 is a schematic configuration diagram of an example of an optical near-field generating apparatus according to an embodiment of the invention. In an optical near-field generating apparatus 100, a conductive scatterer 10 is formed for example on an optically transparent substrate 1. The scatterer 10 causes an optical near-field to be generated by being illuminated by incident light L from a light source 101 via a collimator lens 102 and a condensing lens 103. The length of the scatterer 10 in the direction parallel to the polarization direction of the incident light L, indicated by an arrow p, is appropriately selected such that when the incident light L is received on the scatterer 10 through the substrate 1 as indicated by an illuminating spot illustrated by a broken line S, a surface plasmon is exited in a surface of the scatterer 10 facing the side of an illuminated body such as an information recording/reproducing medium, etc. In the example illustrated in FIG. 3, the scatterer 10 is in a rectangular shape in which both end parts are semicircle, a so-called a rod-like shape, however, it may be a rectangular shape, a triangular shape, a circular shape, etc.

A conductive body 20 is arranged in the vicinity of the scatterer 10, for example on the substrate 1. The conductive body 20 and the scatterer 10 are arranged on a surface of the substrate 1 on the same side, and the conductive body 20 is influenced by the illumination of the incident light L incident through the substrate 1 and the surface plasmon of the scatterer 10 and thereby a surface plasmon is generated also on the surface of the conductive body 20. The conductive body 20 is shaped such that the oscillation direction of the surface plasmon thereof is approximately parallel to the oscillation direction of the surface plasmon of the scatterer 10, and the generation region of the surface plasmon of the conductive body 20 exists in a position deviated from the region extending in the oscillation direction of the surface plasmon to be generated on the scatterer 10. In the example illustrated in FIG. 3, the edge portion of an opposing surface 21 opposing the scatterer 10 of the conductive body 20 is arranged approximately in parallel to the polarizing direction of the incident light L. The edge portion of the opposing surface 21 is arranged in a position deviated from the region extending in the oscillating direction of the surface plasmon to be generated on the scatterer 10. Note that when the scatterer 10 and the conductive body 20 are arranged on the substrate 1, the incident light L becomes a propagating light propagating through the substrate 1. In the following description, the incident light includes the propagating light.

Figure 4:
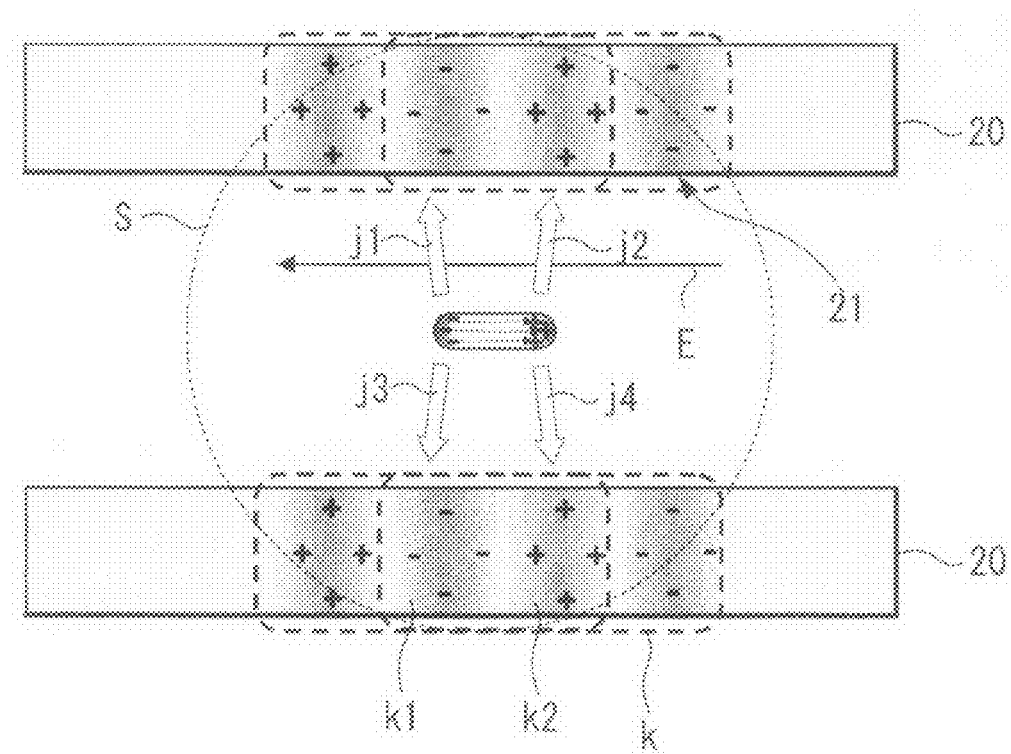
FIG. 4 is an explanatory diagram for explaining the amplification effect of an optical near-field by a conductive body in the optical near-field generating apparatus according to the embodiment of the invention.

In FIG. 4, illustrated are schematic charge distribution patterns of surface plasmons generated on the surfaces of the scatterer 10 and the conductive bodies 20. In FIG. 4, an example is illustrated in which the conductive bodies 20 in belt-like shapes are arranged approximately in parallel to the longitudinal direction of the rod-like shaped scatterer 10, that is, approximately in parallel to the polarizing direction of the incident light. By thus arranging the opposing surface 21 of the conductive body 20 approximately in parallel to the oscillation direction of the surface plasmon generated on the scatterer 10, the edge portion of the opposing surface 21 of the conductive body 20 opposing the scatterer 10 is approximately parallel to the polarizing direction of the incident light and is located in a position deviated from the region extending in the oscillation direction of the surface plasmon generated on the scatterer 10. It should be noted that as described later, the edge portion of the conductive body 20 may be located in the region extending in the oscillation direction of the surface plasmon to be generated on the scatterer 10.

The shape of the optical spot of the incident light is indicated with a broken line S, and the electric field vector of the incident light is indicated with an arrow E. In this case, a very strong optical near-field is generated at both ends in the resonating direction of the scatterer 10, and a relatively weak optical near-field, which, if there exists no formal restriction, extends to a broad area as compared with the scatterer 10, is generated in the vicinity of the opposing surface 21 of the conductive body 20 opposing the scatterer 10. As described later, if the conditions such as the shape of the conductive body 20 and the distance between the opposing surface 21 of the conductive body 20 opposing the scatterer 10 and the scatterer 10 are satisfied, respective optical near-fields are electro-magnetically coupled with each other. Then, when the light intensity of the optical near-field of the scatterer 10 is very strong relative to the light intensity of the optical near-field of the conductive body 20, the electron movement on the surface of the conductive body 20 is determined by being influenced by the surface plasmon on the surface of the scatterer 10 as schematically indicated with arrows j1-j4 in FIG. 4.

As described above, a surface plasmon on a conductive body cannot be exited only by direct illumination of incident light (including a propagating light), however, in this case, being influenced by the strong optical near-field from the scatterer 10, the charge phase distribution on the surface of the conductive body 20 is influenced in the form of coupling, and it is believed that under a certain condition, a surface plasmon is excited on the surface of the conductive body 20. That is, in FIG. 4, as a minus charge and a plus charge are schematically indicated in an area surrounded by a dashed-line k on the conductive body 20, a minus charge distribution k1 and a plus charge distribution k2 are generated in cycles correspondingly to the charge distribution at both ends of the scatterer 10. It is believed that as a result of this, the energy of the incident light is converted to the surface plasmons on the scatterer 10 and the conductive body 20 and these plasmons are electro-magnetically coupled, and thereby the light intensity of the optical near-field on the scatterer 10 is increased.

Figure 5:
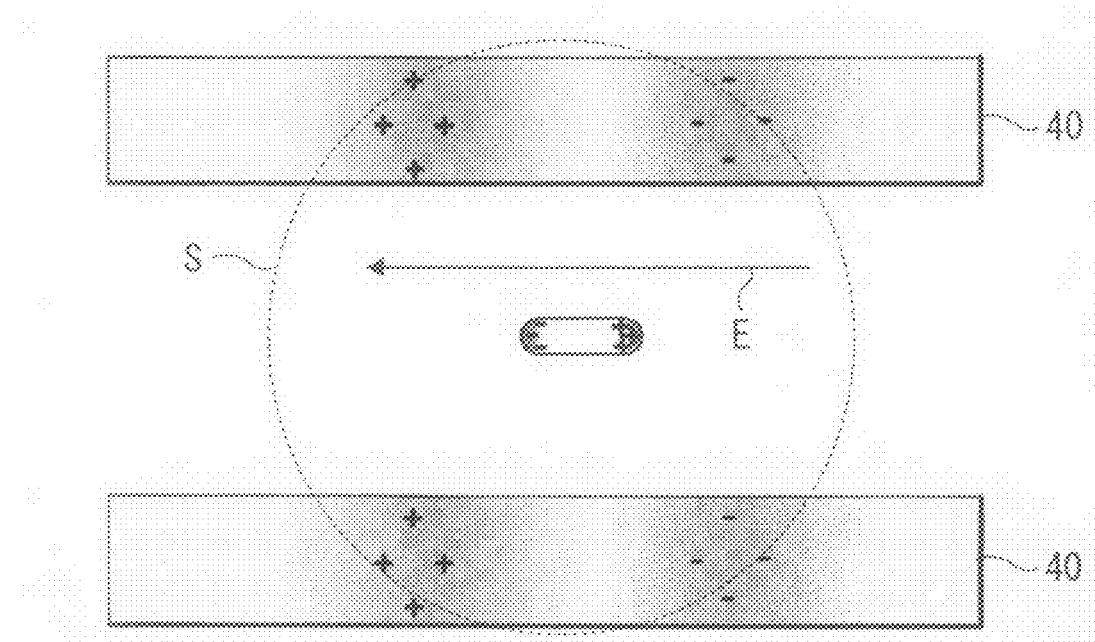
FIG. 5 is an explanatory diagram for explaining the amplification effect of an optical near-field by a comparative example.

On the other hand, as illustrated in FIG. 5, even when a conductive body 40 is provided, when the distance from the scatterer 10 is relatively large, the conductive body 40 is not influenced by the surface plasmon on the surface of the scatterer 10, that is, the charge phase distribution on the surface of the conductive body 40 is not influenced in the form of coupling, and is influenced only by the electric field E of the incident light, so that only a weak polarization is generated. In this case, the intensity of the optical near-field generated on the scatterer 10 is hardly amplified.

Note that because it is important that the oscillation motion of electrons on the conductive body 20 is determined by the influence of the surface plasmon resonance of the scatterer 10 and the influence of the incident light, the shape of the edge portion of the opposing surface 21 of the conductive body 20 opposing the scatterer 10 is preferably a shape not limiting the oscillation motion of electrons with respect to the oscillation direction of electrons, that is, the polarizing direction of the incident light, and it is optimum that the edge portion of the opposing surface 21 is parallel to the polarizing direction of the incident light. However, it is believed that if the edge portion of the opposing surface 21 is at an angle not exceeding 45° relative to the polarizing direction of the incident light, the oscillation motion of electrons is not hindered and a surface plasmon can be generated. Accordingly, the opposing surface 21 of the conductive body 20 opposing the scatterer 10 is preferably shaped so as to form an angle not exceeding 45°, more preferably shaped to form an angle not exceeding 30°, relative to the polarizing direction of the incident light.

Next, description is made with respect to a result of examining the shapes of the conductive body 20 and the scatterer 10 that enable obtaining an appropriate multiplication factor when the conductive body 20 is provided to increase the intensity of an optical near-field to be generated on the scatterer 10.

Figure 6:
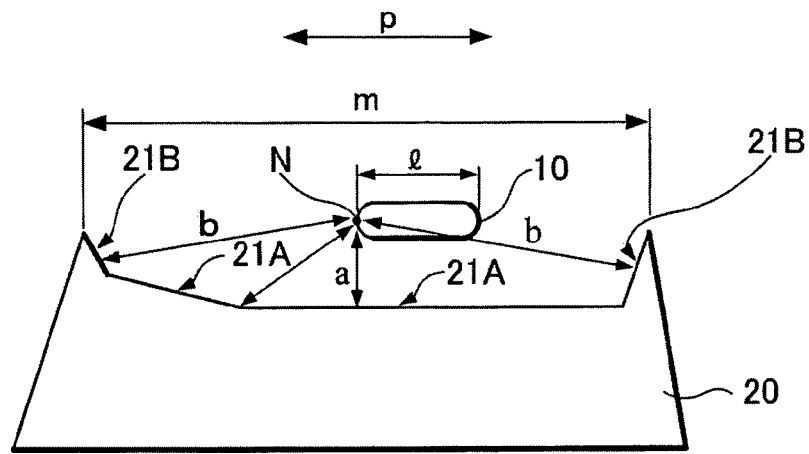
FIG. 6 is an explanatory diagram for explaining the shape of an example of the conductive body of the optical near-field generating apparatus according to the embodiment of the invention.

FIG. 6 illustrates general planar shapes of the scatterer 10 and the conductive body 20. As illustrated in FIG. 6, the length of the scatterer 10 in the direction parallel to a polarizing direction p of incident light is 1, and the length of the conductive body 20 in the direction parallel to the polarizing direction p is m. When the length of the conductive body 20 is partially different, the length of the surface opposing the scatterer 10 is m.

Further, in the surface of the conductive body 20 opposing the scatterer 10, a portion forming an angle between 0° and 45° relative to the polarizing direction of incident light is an opposing surface 21A and a portion forming an angle greater than 45° but not exceeding 90° is an opposing surface 21B. Further, the shortest distance from a peak intensity position N of an optical near-field of the scatterer 10 to the opposing surfaces 21A and 21B are a and b, respectively.

As described above, when an optical near-field generating apparatus according to an embodiment of the invention is used for an information recording/reproducing apparatus, in portions of a scatterer other than the portion where an intended optical near-field is generated, the intensity of the optical near-field is preferably small as much as possible. That is, it may be necessary to suppress the intensity of an optical near-field generated in a conductive body that is arranged in the vicinity of the scatterer sufficiently small. Therefore, it may be necessary to prevent a surface plasmon resonance from occurring on the conductive body. Accordingly, the length of the conductive body along the polarizing direction of incident light may only be needed to be deviated from the condition that a surface plasmon resonance is caused, and for example, by making the conductive body sufficiently longer than the scatterer, the intensity of an optical near-field to be generated on the conductive body can be sufficiently suppressed.

Figure 7:
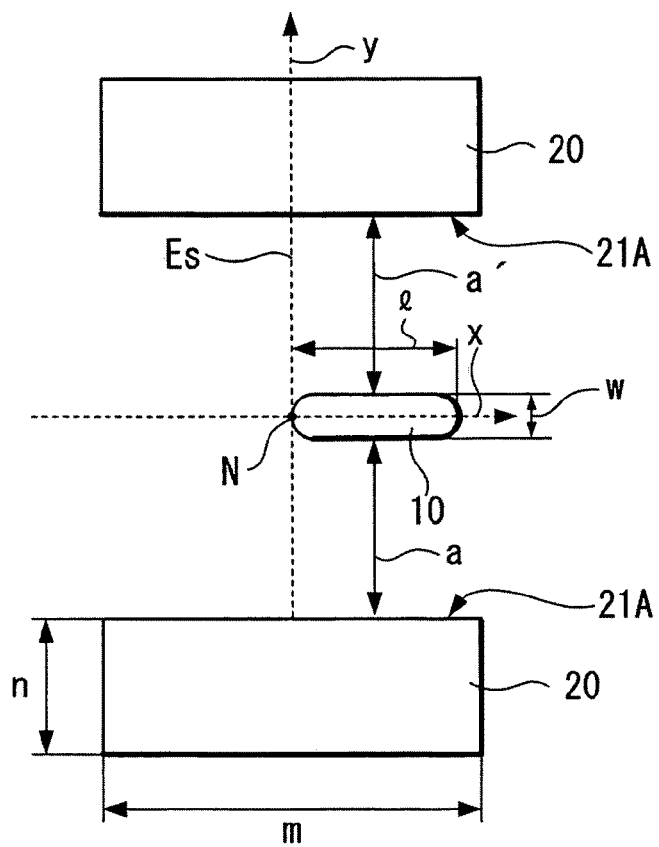
FIG. 7 is a schematic planar view of major parts of an example of the optical near-field generating apparatus according to the embodiment of the invention.

First, the scatterer 10 and the conductive body 20 are arranged in an arrangement shape illustrated in FIG. 7, and how the multiplication factor of the intensity of an optical near-field generated on the scatterer 10 is changed depending on the shapes of the conductive body 20 is obtained by calculation. As indicated in FIG. 7, in this example, using the scatterer 10 in a rod-like shape, when the length of the scatterer 10 in the direction parallel to the polarization direction of incident light is 1 and the width in the direction perpendicular to the polarization direction of the incident light is w, it is assumed as that l=100 nm and w=24 nm. A center line of the scatterer 10 parallel to the polarizing direction of the incident light is indicated by a broken arrow x, and an extension line in the width direction at a tip end of the scatterer 10 where an optical near-field is generated, which is perpendicular to the center line, is indicated by a broken arrow y. Two pieces of the conductive body 20 are disposed on both sides of the scatterer 10 to oppose the side surfaces along the longitudinal direction of the scatterer 10. The material of the conductive bodies 20 and the scatterer 10 is gold (Au), and the conductive bodies 20 and the scatterer 10 are arranged on a substrate (not shown) made of SiO2. When the distance between the opposing surface 21A of each conductive body 20 opposing the scatterer 10 and a side surface of the scatterer 10 opposing the conductive body 20 is a', the distance a from the optical near-field peak intensity point N of the scatterer 10 to the opposing surface 21A is a'+w/2=a'+12 nm. Note that the distances of the conductive bodies 20 from the scatterer 10 are the same. Further, a thin TbFeCo film (not shown) is provided over the entire surfaces of the scatterer 10 and the conductive bodies 20 through a gap of 8 nm.

Figure 8:
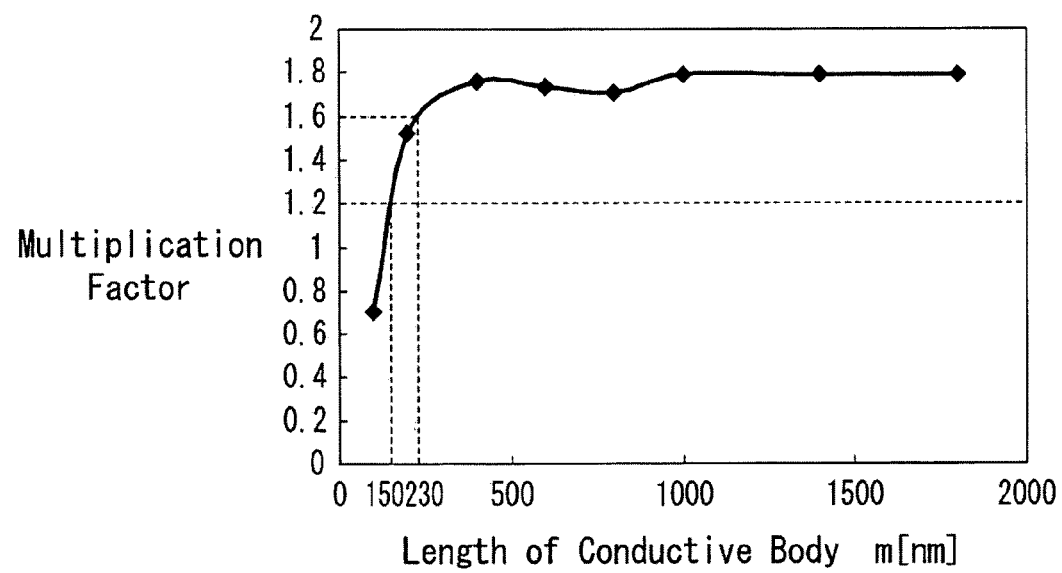
FIG. 8 is a diagram illustrating a change in the multiplication factor of an optical near-field relative to the length of a conductive body in the example of the optical near-field generating apparatus according to the embodiment of the invention of FIG. 7.
Figure 9:
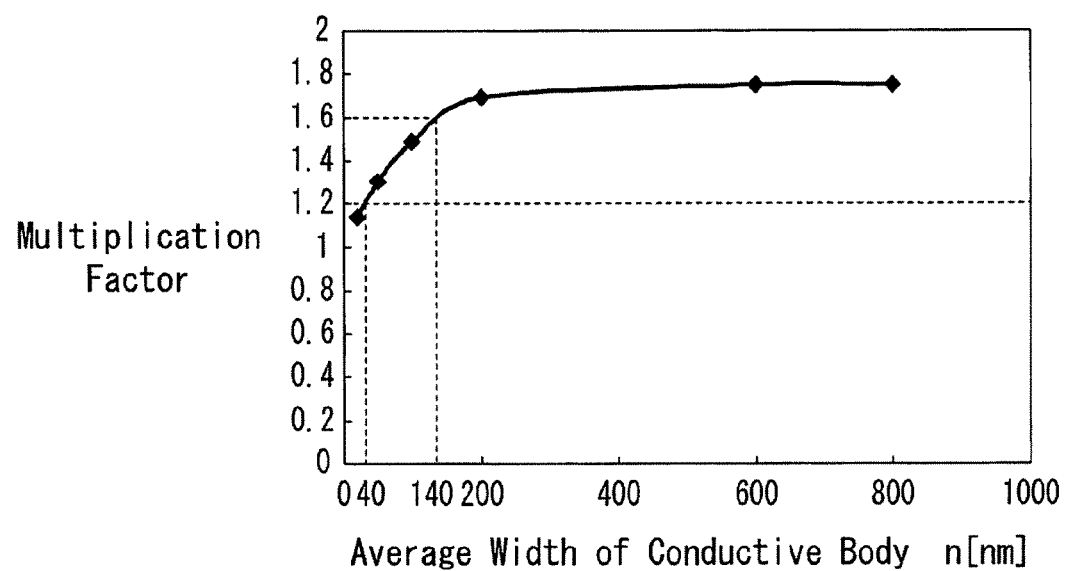
FIG. 9 is a diagram illustrating a change in the multiplication factor of an optical near-field relative to the average width of the conductive body in the example of the optical near-field generating apparatus according to the embodiment of the invention of FIG. 7.

The multiplication factor of the intensity of an optical near-field of the scatterer 10 when the length m of the conductive body 20 in the direction parallel to the polarizing direction of the incident light and the length n in the direction perpendicular to the polarizing direction of the incident light are changed, respectively, has been calculated, a result of which being illustrated in FIG. 8 and FIG. 9. In FIG. 8, the length n of the conductive body 20 in the direction perpendicular to the polarizing direction of the incident light is set sufficiently large, and in FIG. 9, the length m of the conductive body 20 in the direction parallel to the polarizing direction of the incident light is set sufficiently large. In both cases, the wavelength of a light emerging from a light source is 780 nm, and the thickness of the film over the conductive bodies 20 and the scatterer 10 is 30 nm. The vertical and horizontal lengths of the substrate 1 are 2000 nm and the thickness thereof is 250 nm.

It should be noted that the multiplication factor of the intensity of the optical near-field has been evaluated by arranging a thin film of TbFeCo 6 nm thick via an 8 nm gap from the surface of the scatterer 10 and by evaluating the square of the intensity of an electric field on the surface of the thin film based on the ratio of a peak value when the conductive body 20 does not exist around the scatterer 10 and a peak value when the conductive body 20 is provided around the scatterer 10.

From the result of FIG. 8, it can be understood that the multiplication factor when the length m of the conductive body 20 is changed is saturated at around 1.8 times, and the length m reaching 90% of this saturated value (about 1.6 times) is m=230 nm=2.3·l, and the length reaching 1.2 times is m=150 nm=1.5·l. If the multiplication factor is 1.2 times, it can be said that the effect is apparent as compared with the case that the conductive body 20 is not provided. It can be said that to make the multiplication factor to 1.2 times, the length m of the conductive body 20 parallel to the polarizing direction of the incident light is preferably made to satisfy m≧1.5·l.

Further, from the result of FIG. 9, even when the width n of the conductive body 20 is changed, the maximum multiplication factor is saturated in the vicinity of 1.8. In this case, the condition to reach 90% of the saturated value is n=140 nm=1.4·l. Further, it can be understood that the width n that the multiplication factor reaches 1.2 times is n=40 nm=0.4·l. Accordingly, it can be said that it is preferable that the length n of the conductive body 20 in the direction perpendicular to the polarizing direction of the incident light satisfies n≧0.4·l.

Note that it is believed that the reason that an effect is obtained by also making the width of the conductive body 20 greater than a certain length is as follows. That is, by the nature that the optical near-field is an electromagnetic field generated with the electron motion, as the area of the conductive body 20 is decreased, the generation area of an optical near-field is decreased, and thereby a coupling amount with the optical near-field of the scatterer 10 is decreased to result in causing the amplification effect to be decreased. Therefore, it may be necessary to make the area of the conductive body 20 sufficiently large to assure the amplification effect, and it is believed that the width of the conductive body 20 in the direction perpendicular to the polarizing direction of the incident light needs to be assured to a certain extent.

Here, description is made more in detail with respect to the reason that the amplification of the intensity of an optical near-field is caused. First, in a conductive body having an opposing surface with an edge portion in a shape parallel to the oscillation direction of free electrons on the conductive body, i.e., the polarizing direction of incident light, when the incident light has been received, the free electrons in the vicinity of the edge portion of the conductive body oscillate without being subjected to a large constraint in the polarizing direction of the incident light. When the edge portion of the conductive body is arranged in such a distance from a scatterer that amplification is caused, having been influenced by a relatively strong optical near-field of the scatterer, the oscillation motion of free electrons in the vicinity of the edge portion of the conductive body and the following electromagnetic field phase distribution are determined. At this time, because the free electrons are not subjected to a large constraint relative to the polarizing direction of the incident light from the beginning, the free electrons settle in a state that the electromagnetic field phase distribution becomes appropriate to be coupled with the optical near-field on the scatterer. As a result of this, around the optical near-field of the scatterer, a reversed electromagnetic field coupling with the optical near-field of the scatterer is formed, and the energy of the incident light is supplied to the scaterer also through the surrounding conductive bodies, and thereby the optical near-field on the scatterer is amplified.

However, if the opposing surface of the conductive body opposing the scatterer, that is, the edge portion of the conductive body, is too close to the scatterer, coupling between the opposing surface of the conductive body opposing the scatterer and the scatterer becomes very strong, and the energy to the conductive body is dispersed. Because of this, it is believed that the intensity of the optical near-field on the scatterer is caused to decrease. By contraries, if the opposing surface of the conductive body opposing the scatterer is too far from the scatterer, the optical near-field of the conductive body and the optical near-field of the scatterer may not be coupled, so that the amplification effect of the optical near-field cannot be obtained. Accordingly, it may be necessary to set the distance between the scatterer and the conductive body in a certain range.

Figure 10A:
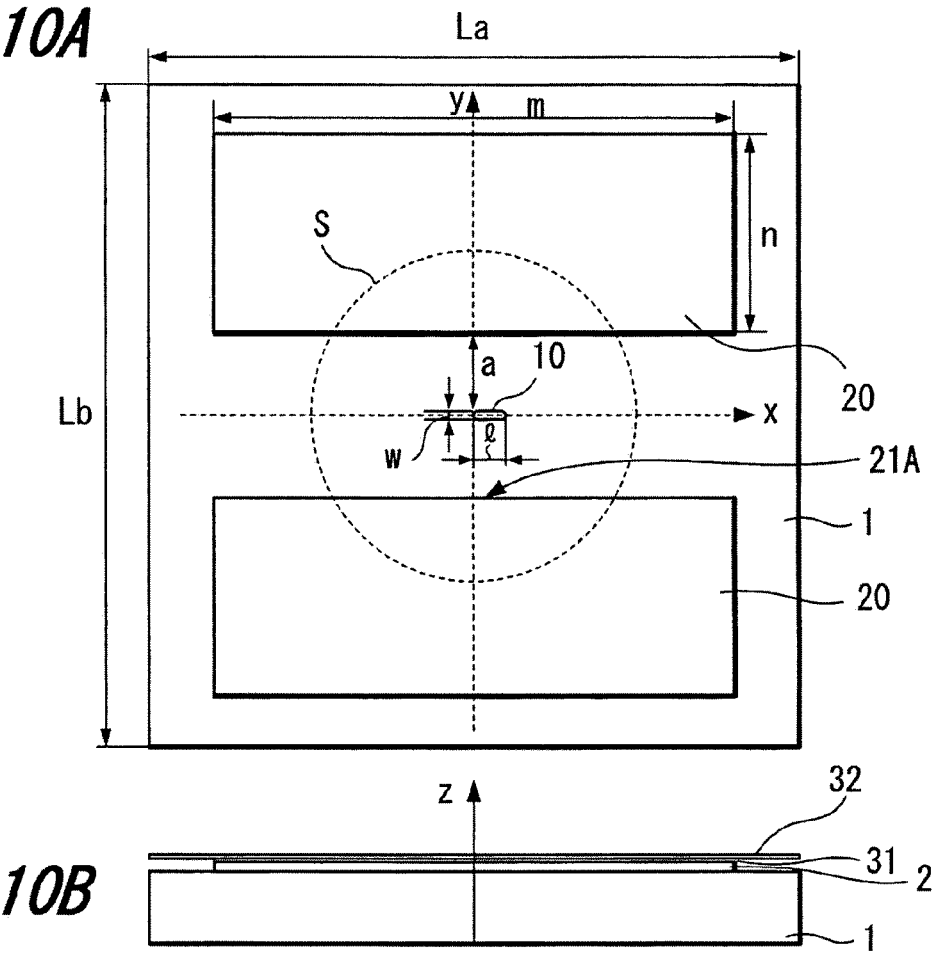
FIG. 10A and FIG. 10B are a schematic plane view and a schematic cross-section view of major parts of another example of the optical near-field generating apparatus according to the embodiment of the invention.
Figure 10B:
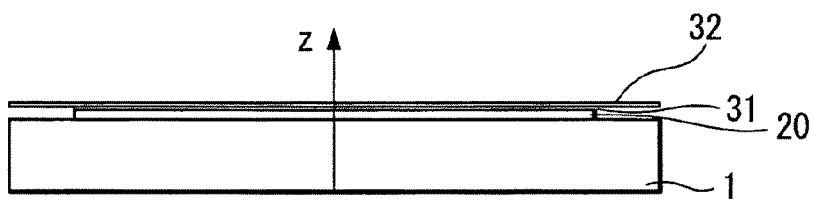
Figure 11:
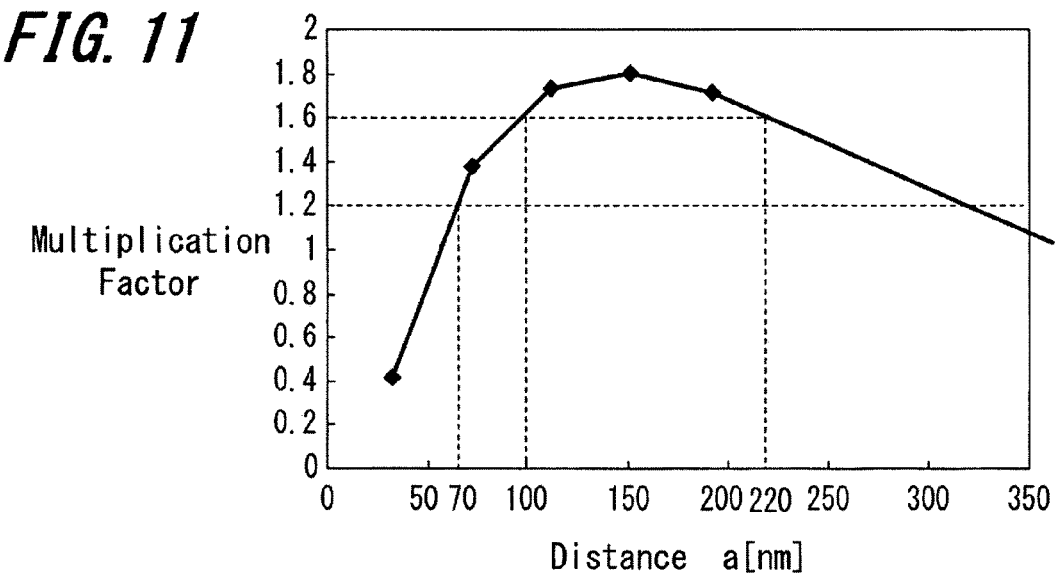
FIG. 11 is a diagram illustrating a change in the multiplication factor of an optical near-field relative to the distance between a conductive body and a scatterer in the example of the optical near-field generating apparatus according to the embodiment of the invention of FIG. 10A and FIG. 10B.

Then, with respect to the distance between a scatterer and a conductive body, the condition for effectively exerting the amplification effect is obtained by calculation. In this example, the scatterer 10 and the conductive body 20 are shaped and arranged as illustrated in a schematic planar diagram of FIG. 10A and a schematic cross-section diagram of FIG. 10B. In FIG. 10A and FIG. 10B, the parts corresponding to those of FIG. 7 are denoted with the same reference symbols and overlapped description is omitted. As illustrated in FIG. 10A, in this example, on the substrate 1 made of SiO2, etc., the scatterer 10 made of rod-like gold is arranged, and the conductive bodies 20 made of gold are arranged on both sides of the scatterer 10 with respect to the direction perpendicular to the longitudinal direction of the scatterer 10. The size of the scatterer 10 is the same as that of the scatterer 10 in the example illustrated in FIG. 7, that is, the length l in the direction parallel to the polarizing direction of incident light is 100 nm, and the width w in the direction perpendicular to the polarizing direction of the incident light is 24 nm. The conductive body 20 is in an approximately rectangular shape, and the length m in the direction parallel to the polarizing direction of the incident light is 1600 nm, and the length n in the direction perpendicular to the polarizing direction of the incident light is 600 nm. The substrate 1, on which the scatterer 10 and the conductive body 20 are arranged, measures 2000 nm both in a length La in the direction parallel to the polarizing direction of the incident light and a length Lb in the direction perpendicular to the polarizing direction of the incident light. Further, the thicknesses of the scatterer 10 and the conductive body 20 are both 30 nm, and the thickness of the substrate 1 is 250 nm. As illustrated in 10B, in this example also, a thin TbFeCo film 32 is arranged over the entire surfaces of the scatterer 10 and the conductive bodies 20 through a gap 31 of 8 nm. In this configuration, with respect to the square of the intensity of an electric field on the surface of the thin TbFeCo film 32 when the distance a of the conductive body 20 from the intensity peak position N of the optical near-field of the scatterer 10 is changed, the multiplication factor has been evaluated based on the ratio of a peak value when the conductive body 20 does not exist around the scatterer 10 and a peak value when the conductive body 20 is arranged around the scatterer 10. FIG. 11 illustrates a result of this.

As apparent from FIG. 11, in the region where the distance a between the conductive body 20 and the scatterer 10 is very small, the peak value of the electric field intensity is rather decreased as compared with the case that the conductive body 20 is not arranged around the scatterer 10, and it is understood that as the distance a increases, the multiplication factor increases. Then, after the maximum amplification degree has been reached at a certain distance, the multiplication factor changes to decrease, and as the distance a is further increased, it tends to gradually reach 1. In the example illustrated in FIG. 10A and FIG. 10B, when the distance a is 150 nm, the multiplication factor becomes the maximum, and the range of the distance a in which 90% of the maximum multiplication factor is reached is $1 \leq a \leq 2.2 \cdot l$. Further, the range of the distance a in which the multiplication factor reaches 1.2 times is $0.7 \cdot l \leq a \leq 3 \cdot l$.

From this result, it can be said that if the distance a between the opposing surface of the conductive body 20 opposing the scatterer 10 and the scatterer 10 is in the range of $0.7 \cdot l \leq a \leq 3 \cdot l$, a sufficient multiplication factor can be obtained as compared with the case that the conductive body 20 is not provided.

Figure 12:
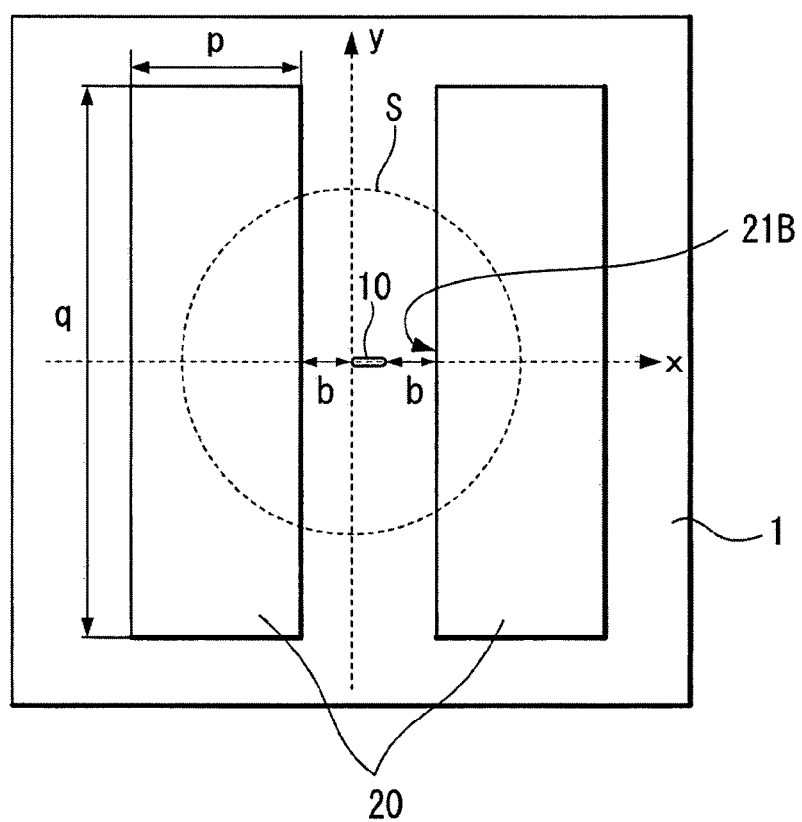
FIG. 12 is a schematic plane view of major parts of another example of the optical near-field generating apparatus according to the embodiment of the invention.

In the above-described example, the case has been examined that the shape of the edge portion of the opposing surface 21A of the conductive body 20 opposing the scatterer 10 is parallel to the polarizing direction of incident light, however, also a case has been examined that the shape of the edge portion of the opposing surface 21A of the conductive body 20 opposing the scatterer 10 is assumed to be approximately perpendicular to the polarizing direction of the incident light. That is, in this example, as illustrated in a schematic planar diagram of FIG. 12, the conductive body 20 is arranged such that the opposing surface 21B opposing the scatterer 10 is nearly perpendicular to the polarizing direction of the incident light. In FIG. 12, the parts corresponding to those of FIG. 10A are denoted by the same reference symbols and overlapped description is omitted. As illustrated in FIG. 12, the conductive body 20 is in an approximately rectangular shape, and the length p in the direction parallel to the polarizing direction of the incident light is 500 nm and the length q in the direction perpendicular to the polarizing direction of the incident light 1600 nm. The planar shapes of the scatterer 10 and the substrate 1 and thicknesses of respective parts are the same as those of the example illustrated in FIG. 10A, the evaluation conditions are the same, and the multiplication factor has been evaluation with respect to the distance b between the opposing surface 21B of the conductive body 20 opposing the scatterer 10 and the scatterer 10. A result of this evaluation is illustrated in FIG. 13.

Figure 13:
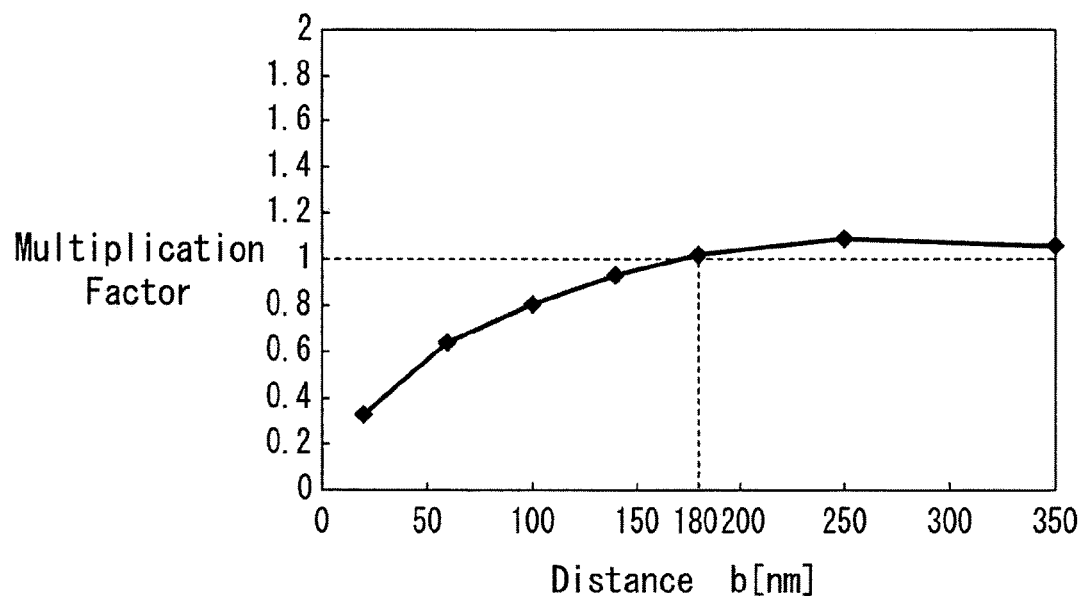
FIG. 13 is a diagram illustrating a change in the multiplication factor of an optical near-field relative to the distance between a conductive body and a scatterer in the example of the optical near-field generating apparatus according to the embodiment of the invention of FIG. 12.

As apparent from FIG. 13, when the distance b is relatively near, the multiplication factor does not reach 1. Further, the maximum value of the multiplication factor is relatively low. The reason thereof is believed to be as follows.

Free electrons collide with the edge portion of the opposing surface 21B to be stacked, and as a result, a strong optical near-field is generated on the edge portion of the opposing surface 21B. Thus, when the intensity of an optical near-field on the edge portion of the opposing surface 21B of the conductive body 20 is strong, and the distance between the edge portion of the opposing surface 21B of the conductive body 20 and the scatterer 10 is near, electromagnetic coupling is caused between the optical near-field on the scatterer 10 and the optical near-field of the edge portion of the opposing surface 21B of the conductive body 20. However, in this case, as described above the oscillation motion of free electrons on the edge portion of the opposing surface 21B is restricted because of the shape of the edge portion of the opposing surface 21B, so that it is believed that the resulting electromagnetic field will not be the appropriate one to be coupled with the optical near-field on the scatterer 10. Accordingly, the opposing surface 21B of the conductive body 20 approximately perpendicular to the polarizing direction of the incident light does not contribute to a large amplification of the intensity of the optical near-field on the scatterer 10, and if the distance of the opposing surface 21B of the conductive body 20 from the scatterer 10 is close, there is a possibility that the generation efficiency of the optical near-field on the scatterer 10 is decreased by contraries. Accordingly, it is desirable that the opposing surface 21B of the conductive body 20 is separated from the scatterer 10 to the distance where the optical near-field on the edge portion of the opposing surface 21B does not influence the optical near-field on the scatterer 10.

From the result of FIG. 13, the range of the distance b in which the intensity of an optical near-field on the scatterer 10 reaches the intensity when the conductive body is not provided is $b \geq 1.8 \cdot l$.

Accordingly, when the surface of the conductive body 20 opposing the scatterer 10 is the opposing surface 21B along the direction perpendicular to the polarizing direction of the incident light, it can be said that the distance b from the peak intensity position N of the optical near-field of the scatterer 10 to the opposing surface 21B of the conductive body 20 preferably satisfies $b \geq 1.8 \cdot l$.

Next, with respect to the shape of the edge portion opposing the scatterer 10 of the conductive body 20, a case has been also examined that both a portion parallel to the polarizing direction of incident light and a portion perpendicular to the polarizing direction of the incident light are included in the edge portion of the conductive body 20. In this example, as illustrated in a schematic planar diagram of FIG. 14, the conductive body 20 has the opposing surface 21A that is nearly parallel to the polarizing direction of the incident light and the opposing surface 21B that is nearly perpendicular to the polarizing direction of the incident light, and the conductivity body 201 is arranged to surround the scatterer 10. The parts corresponding to those of FIG. 10A, FIG. 10B, and FIG. 12 are denoted by the same reference symbols and overlapped description is omitted. In this example, a width w1 in the direction perpendicular to the polarizing direction of the incident light is 600 nm, a width w2 in the direction parallel to the polarizing direction of the incident light is 500 nm, and the dimension and the material configuration of other parts are the same as those in the examples described with reference to FIG. 10A, FIG. 10B, and FIG. 12. A distance a' between the opposing surface 21A opposing a side surface along the longitudinal direction of the scatterer 10 and the side surface of the scatterer 10 and a distance b between the opposing surface 21B opposing an end portion of the scatterer 10 and the end portion of the scatterer 10 are changed, respectively, and the multiplication factor has been calculated. A result of this is illustrated in FIG. 15.

Figure 15:
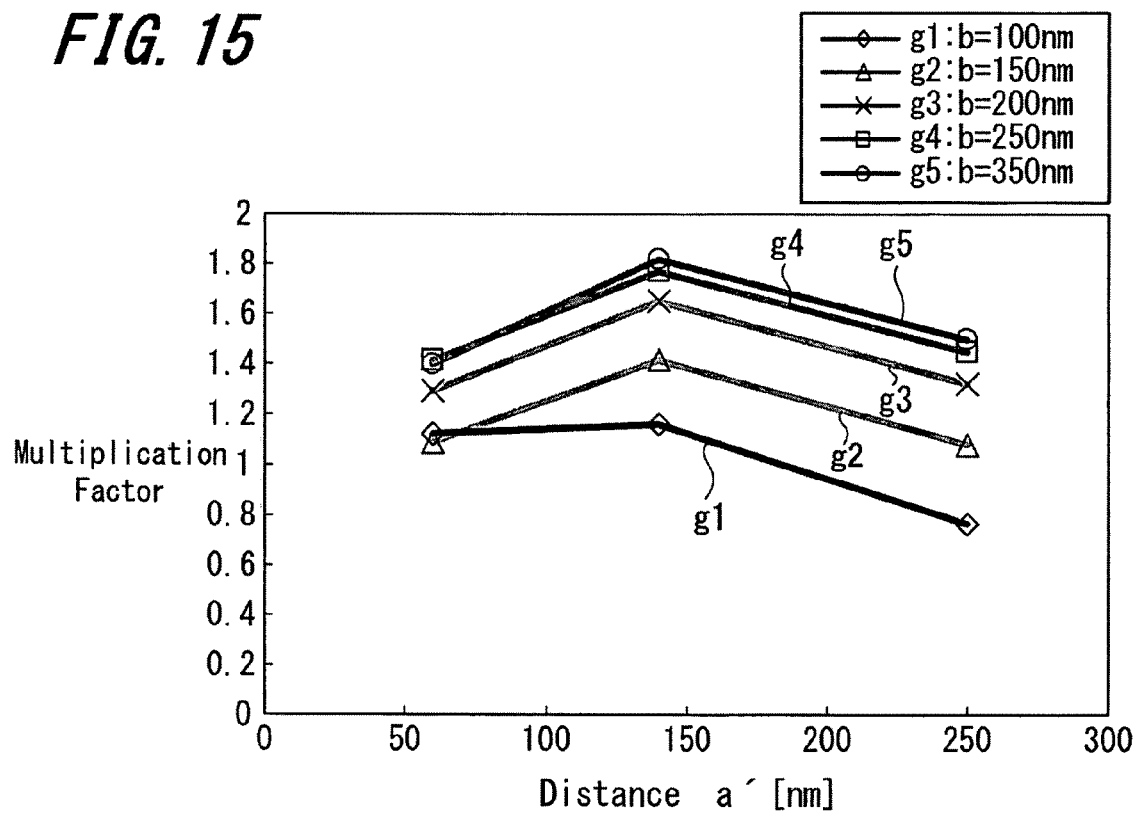
FIG. 15 is a diagram illustrating a change in the multiplication factor of an optical near-field relative to the distance between a conductive body and a scatterer in the example of the optical near-field generating apparatus according to the embodiment of the invention of FIG. 14.

In FIG. 15, a solid line g1 indicates a case in which b=100 nm, a solid line g2 indicates a case in which b=150 nm, a solid line g3 indicates a case in which b=200 nm, a solid line g4 indicates a case in which b=250 nm, and a solid line g5 indicates a case in which b=350 nm. From FIG. 15, it is understood that when a'=150 nm and b=350 nm, the multiplication factor of 1.8 times is obtained. Note that in the solid line g1 where b=100 nm, it is understood that the multiplication factor becomes one time or more depending on the distance a', however, the multiplication factor equal to or more than 1.2 times may not be obtained. Accordingly, it is preferable that the distance b satisfies at least b>l, and it is more preferable that the distance b satisfies $b \geq l$. Further, it can be said that the distance a' (a'=a+w/2) is selected in a certain range.

Next, description is made with respect to the optical spot shape of incident light illuminated to a scatterer and a conductive body. When the optical spot shape is other than a near perfect circle, it is believed that depending on to which part of the conductive body 20 the incident light is strongly illuminated, that is, depending on the intensity distribution of the incident light, the multiplication factor changes. Of the opposing surfaces of the conductive body 20 opposing the scatterer 10, the opposing surface 21A that is nearly parallel to the polarizing direction of incident light (that is, forming an angle between 0° and 45° relative to the polarizing direction of the incident light) contributes to the amplification of an optical near-field of the scatterer 10, so that it is preferable that the incident light is illuminated relatively strongly to the opposing surface 21A. On the other hand, the amplification effect cannot be obtained so much with respect to the opposing surface 21B that is nearly perpendicular to the polarizing direction of the incident light (forming an angle greater than 45° but not exceeding 90° relative to the polarizing direction of the incident light) as can be understood from FIG. 13, and further as generation of an optical near-field is not necessary in the opposing surface 21B from the viewpoint of the amplification of the optical near-field on the scatterer 10, it is preferable that the illumination intensity of the incident light in the vicinity of the opposing surface 21B is relatively low. Accordingly, it can be said that when the average incident light intensity on the opposing surface 21A is Ia1, and the average incident light intensity on the opposing surface 21B is Ia2, by adjusting the positional relation between the optical spot of the incident light and the conductive body 20 so as to satisfy $Ia1 \geq Ia2$, a relatively large amplification effect is obtained.

On the other hand, when the optical spot shape of incident light illuminated to the scatterer 10 and the conductive body 20 is approximately circle, it can be said that if the distance a of the opposing surface 21A of the conductive body 20 nearly parallel to the polarizing direction of the incident light from the peak intensity position N of the optical near-field on the scatterer 10 and the distance b of the opposing surface 21B nearly perpendicular to the polarizing direction of the incident light from the peak intensity position N of the optical near-field on the scatterer 10 satisfy $a \leq b$, a sufficient amplification effect is obtained with respect to the intensity of the optical near-field of the scatterer 10.

Below, description will be made with respect to each embodiment of the optical near-field generating apparatus of the invention.

First Embodiment

Figure 16:
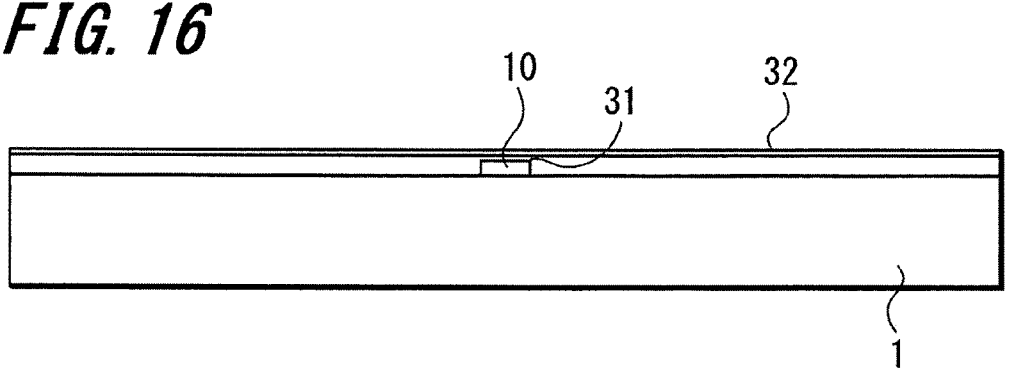
FIG. 16 is a schematic cross-section view of major parts of another example of the optical near-field generating apparatus according to the embodiment of the invention.
Figure 17A:
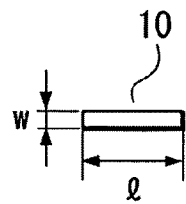
FIG. 17A, FIG. 17B, FIG. 17C, and FIG. 17D are schematic plane views of examples of scatterers of the optical near-field generating apparatus according to the embodiment of the invention of FIG. 16.
Figure 17B:
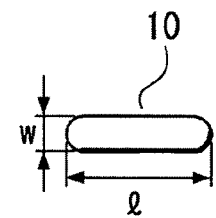
Figure 17C:
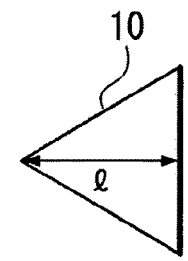
Figure 17D:
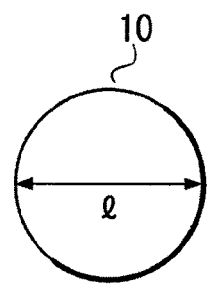

First, regarding the cases that the conductive body 20 is arranged as illustrated in FIG. 10A and FIG. 10B and FIG. 12, examples in which the shape of the scatterer 10 is changed are described. In each example, how the multiplication factor of the peak intensity of an optical near-field changes has been examined. In this example, as illustrated in a schematic cross section of FIG. 16, the scatterer 10 in an approximately rectangular shape in cross section and 30 nm thick is arranged on the substrate 1 made of SiO2, and a 6 nm thick thin TbFeCo film 32 is arranged over the scatterer 10 (and the substrate 1) through an 8 nm gap 31. The planar shape of the scatterer 10 is changed as illustrated in FIG. 17A through FIG. 17D, and the peak intensity of each optical near-field has been calculated. In the example of FIG. 17A, the scatterer 10 is in a planar rectangular shape, and the length l in the direction parallel to the polarizing direction of incident light is 70 nm, and the width w in the direction perpendicular to the polarizing direction of the incident light is 12 nm. In the example of FIG. 17B, the scatterer 10 is in a rectangular shape in which corner portions are semi-circles, a so-called rod-like shape, and the length l is 100 nm and the width w is 24 nm. In the example of FIG. 17C, the scatterer 10 is in an equilateral triangular shape, and the length l is 110 nm. Further, in the example illustrated in FIG. 17D, the scatterer 10 is in a circular shape, and the diameter is 130 nm.

Figure 18:
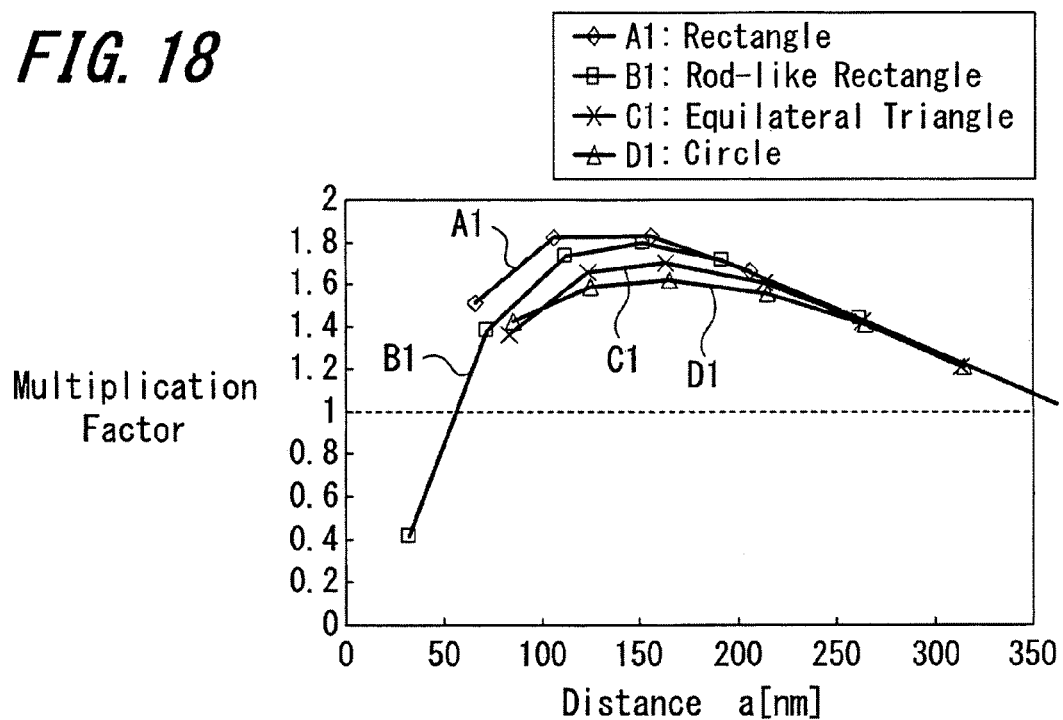
FIG. 18 is a diagram illustrating a change in the multiplication factor of an optical near-field relative to the distance between a conductive body and a scatterer in the optical near-field generating apparatus according to the embodiment of the invention, with respect to each example of the scatterers of FIG. 17A through FIG. 17D, when the conductive body is arranged as in the optical near-field generating apparatus illustrated in FIG. 10A and FIG. 10B.
Figure 19:
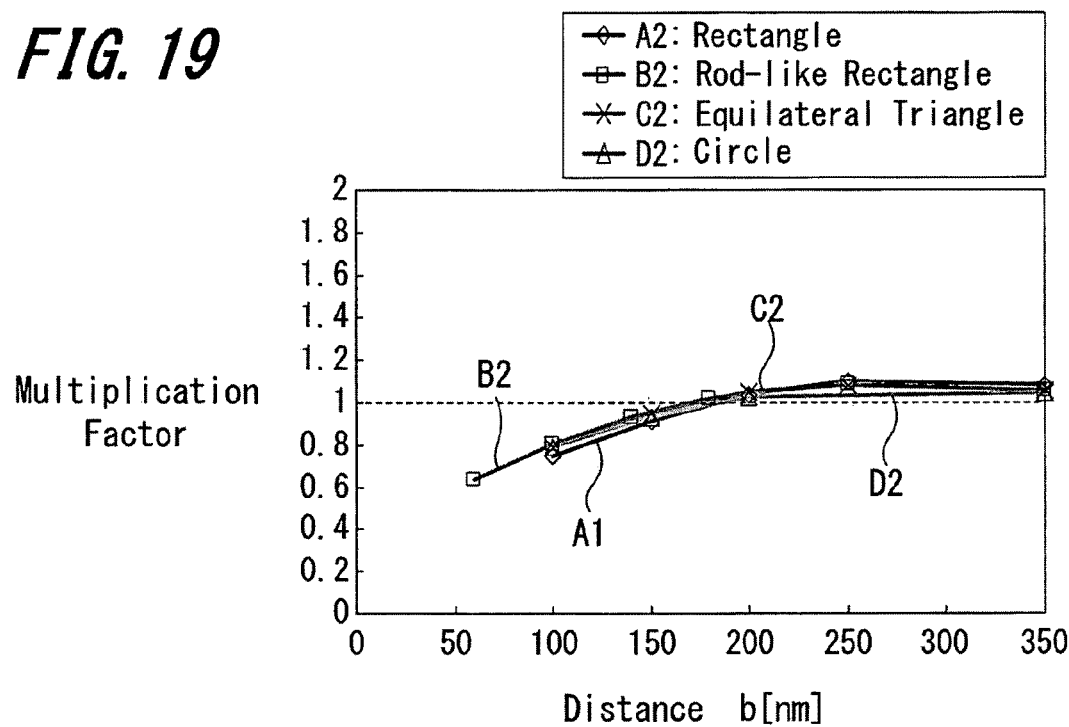
FIG. 19 is a diagram illustrating a change in the multiplication factor of an optical near-field relative to the distance between a conductive body and a scatterer in the optical near-field generating apparatus according to the embodiment of the invention, with respect to each example of the scatterers of FIG. 17A through FIG. 17D, when the conductive body is arranged as in the optical near-field generating apparatus illustrated FIG. 12.
Figure 20A:
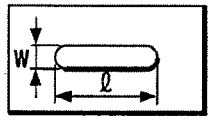
FIG. 20A, FIG. 20B, FIG. 20C, and FIG. 20D are schematic plane views of examples of scatterers of an optical near-field generating apparatus according to an embodiment of the invention.
Figure 20C:
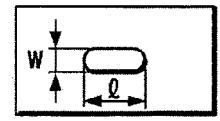
Figure 20B:
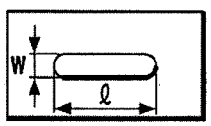
Figure 20D:
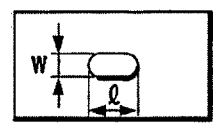

With respect to the scatterers 10 illustrated in FIG. 17A through FIG. 17D, while assuming the peak value of the optical near-field intensity to be 1, multiplication factors when the conductive bodies 20 illustrated in FIG. 10A and FIG. 10B and FIG. 12 have been arranged are illustrated in FIG. 18 and FIG. 19, respectively. The dimensions and arrangement of respective parts other than the scatterer 10 are the same as those in the examples illustrated in FIG. 10A and FIG. 10B and FIG. 12. In FIG. 18 and FIG. 19, A1 through D1 and A2 through D2 indicate the results obtained with the scatterer 10 of respective shapes illustrated in FIG. 17A through FIG. 17D.

From the result of FIG. 18, it can be understood that when the conductive body 20 is arranged as illustrated in FIG. 10A and FIG. 10B, that is, when the conductive body 20 has the opposing surface 21A near parallel to the polarizing direction of incident light, if the distance from the scatterer 10 is equal to or greater than a certain distance, an amplification effect can be obtained with respect to all of the shapes of the scatterer 10 illustrated in FIG. 17A through FIG. 17D.

It should be noted that from the result of FIG. 19, it is understood that when the conductive body 20 is arranged such that the opposing surface 21B is nearly perpendicular to the polarizing direction of the incident light as illustrated in FIG. 12, a large amplification may not be obtained, and that in this case, independently of the shape of the scatterer 10, if the distance to the scatterer 10 is too close, by contraries, the optical near-field intensity is decreased. Therefore, it is desirable that the conductive body 20 is separated from the scatterer 10 by a predetermined distance or more.

The shape of the scatterer 10 is not limited to those in the examples illustrated in FIG. 17A through FIG. 17D, and for example, an ellipse, a polygonal shape, a fan-like shape, etc. and combination of these shapes and those illustrated in FIG. 17A through FIG. 17D, and other shapes having curved lines may be allowed. Further, a shape deformed in the thickness direction, that is, a shape in which the thickness is partly changed, may be allowed, and any shape can be applied to the scatterer 10 of the optical near-field generating apparatus according to an embodiment of the invention so long as a relatively strong optical near-field can be generated at a predetermined place of the scatterer 10 by a surface plasmon resonance.

Second Embodiment

Next, with respect to examples in which the materials of the scatterer 10 and the substrate 1 and the wavelength of the incident light have been changed, how the multiplication factor of the peak intensity of each optical near-field changes has been similarly examined. FIG. 20A through FIG. 20D are planar views illustrating examples of the scatterer 10. In the examples illustrated in FIG. 20A through FIG. 20D, the scatterer 10 is in a rod-like shape. In the example illustrated in FIG. 20A, the length l of the scatterer 10 is 100 nm, the width w is 24 nm, the material of the scatterer 10 is silver, the material of the substrate 1 is quartz, and the wavelength of the incident light is 780 nm. In the example illustrated in FIG. 20B, the length l of the scatterer 10 is 100 nm, the width w is 24 nm, the material of the scatterer 10 is gold, the material of the substrate 1 is quartz, and the wavelength of the incident light is 780 nm. In the example illustrated in FIG. 20C, the length l of the scatterer 10 is 60 nm, the width w is 24 nm, the material of the scatterer 10 is gold, the material of the substrate 1 is diamond, and the wavelength of the incident light is 780 nm. In the example illustrated in FIG. 20D, the length l of the scatterer 10 is 50 nm, the width w is 24 nm, the material of the scatterer 10 is gold, the material of the substrate 1 is quartz, and the wavelength of the incident light is 650 nm.

Figure 21:
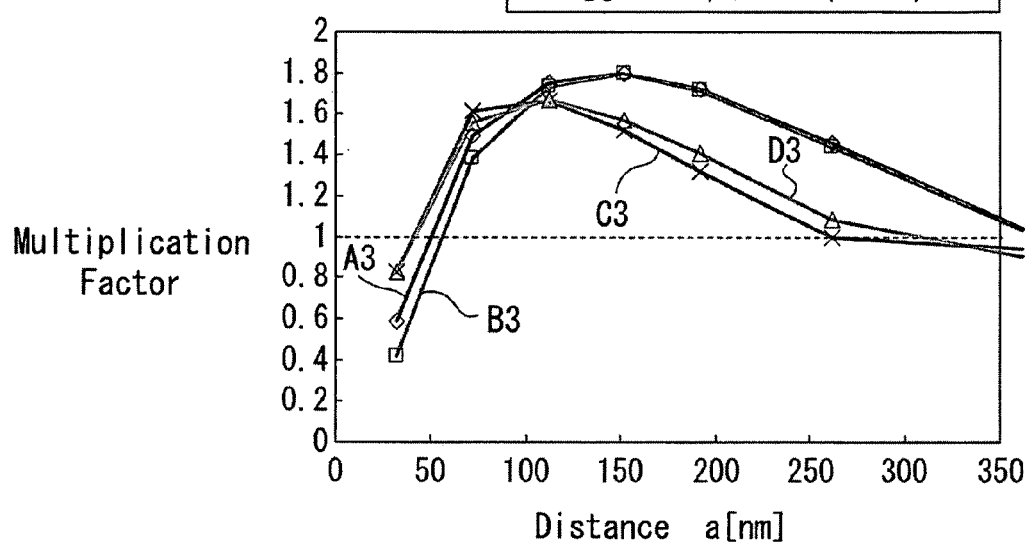
FIG. 21 is a diagram illustrating a change in the multiplication factor of an optical near-field relative to the distance between a conductive body and a scatterer in the optical near-field generating apparatus according to the embodiment of the invention, with respect to each example of the scatterers of FIG. 20A through FIG. 20D, when the conductive body is arranged as in the optical near-field generating apparatus illustrated in FIG. 10A and FIG. 10B.
Figure 22:
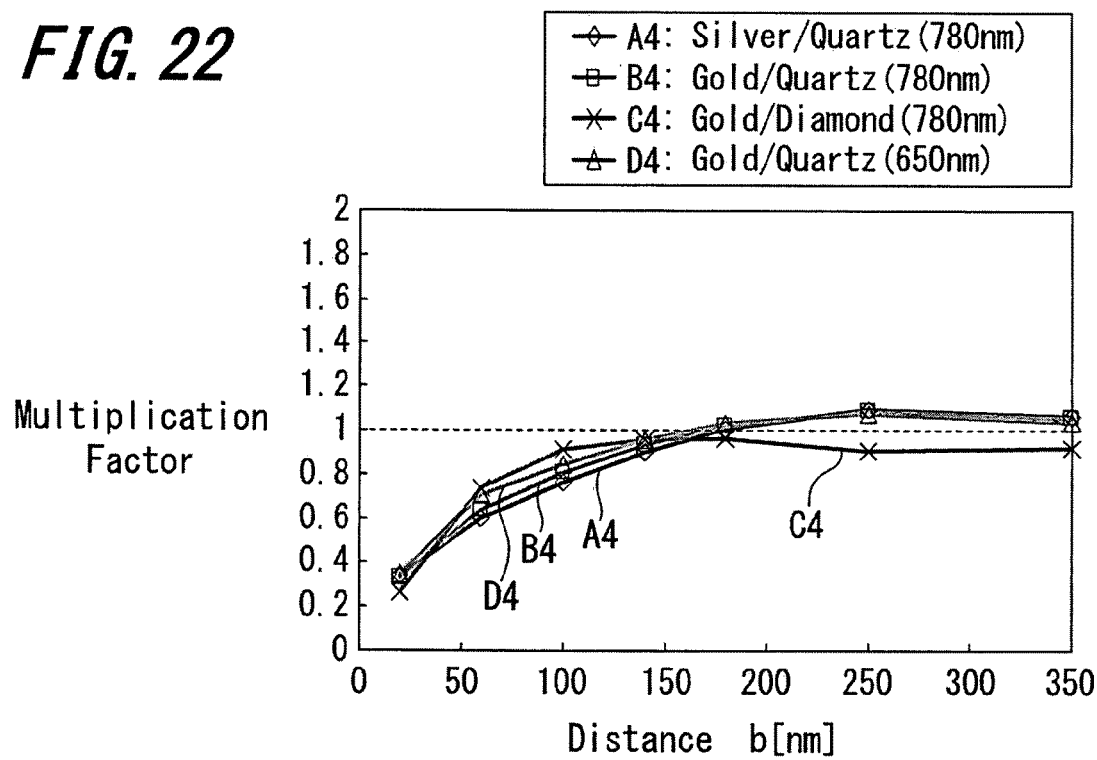
FIG. 22 is a diagram illustrating a change in the multiplication factor of an optical near-field relative to the distance between a conductive body and a scatterer in the optical near-field generating apparatus according to the embodiment of the invention, with respect to each example of the scatterers of FIG. 20A through FIG. 20D, when the conductive body is arranged as in the optical near-field generating apparatus illustrated in FIG. 12.

With respect to these scatterers 10 and substrates 1, the peak value of the intensity of each optical near-field when conductive bodies are not arranged around each scatterer 10 is assumed to be 1, and the amplification factors when the conductive bodies 20 illustrated in FIG. 10A and FIG. 10B and FIG. 12 have been arranged are illustrated in FIG. 21 and FIG. 22, respectively. The dimensions and arrangement of respective parts other than the scatterer 10 and the substrate 1 are the same as those of the examples illustrated in FIG. 10A, FIG. 10B and FIG. 12.

From the result of FIG. 21, it is understood that as in the example illustrated in FIG. 18, by arranging the opposing surface 21A of the conductive body 20 that is near parallel to the polarizing direction of the incident light in a position separated from the scatterer 10 by a given distance or more, an amplification effect has been obtained with respect to all the examples of the materials of the scatterer 10 and the substrate 1.

On the other hand, as apparent from FIG. 22, it is understood that when the conductive body 20 is shaped to have only the opposing surface 21B that is near perpendicular to the polarizing direction of the incident light, a large amplification effect is not obtained, and in this case, independently of the shape of the scatterer 10, if the distance to the scatterer 10 is too close, the intensity of the optical near-field of the scatterer 10 is decreased by contraries. Therefore, it is preferable that the conductive body 20 is separated from the scatterer 10 by a predetermined distance or more.

Note that the materials of the scatterer 10 and the conductive body 20 are not limited to those examples described above. For the materials of the scatterer 10 and the conductive body 20, any material having satisfactory conductivity, such as metals (for example, Pt, Cu, Al, Ti, W, Ir, Pd, Mg, Cr), semiconductors (Si, DaAs), carbon nanotube, etc., may be applied. Further, the scatterer 10 needs not be made of a single material and may include a plurality of such conductive materials as described above. The material of the substrate 1 in which the scatterer 10 and the conductive body 20 are formed is preferably optically transparent in the used wavelength, for example, 70% or more in the transmissivity in the used wavelength band, for causing a light to be incident to the scatterer 10 and the conductive body 20 efficiently through the substrate 1.

For example, for the material of the substrate 1 forming the scatterer 10, IV family semiconductors such as Si, Ge, etc., III-V family compound semiconductors represented by GaAs, AlGaAs, GaN, InGaN, InSb, GaSb, and AlN, II-VI family compound semiconductors such as ZnTe, ZnSe, ZnS, ZnO, etc., oxide insulators such as ZnO, Al2O3, SiO2, TiO2, CrO2, CeO2, etc., nitride insulators such as SiN, etc., plastics, etc. can be applied.

Further, when the substrate 1 is configured by an oxide insulator or a nitride insulator to improve the adhesion between the scatterer 10 and the substrate 1, it is preferable to form an adhesion layer (intermediate metal layer) composed of Zn, Ti, Cr, Al, etc. between the scatterer 10 and the substrate 1. Thereby, peeling of the scatterer 10 from the substrate 1 can be surely suppressed, and the strength of the scatterer 10 is improved.

Further, with respect to the wavelength of the incident light, any wavelength may be applied so long as it can excite a surface plasmon resonance on the scatterer 10.

Third Embodiment

Next, regarding a case that plural scatterers are provided, description is made with respect a result of examining the amplification effect of an optical near-field based on arrangement of conductive bodies.

Figure 23:
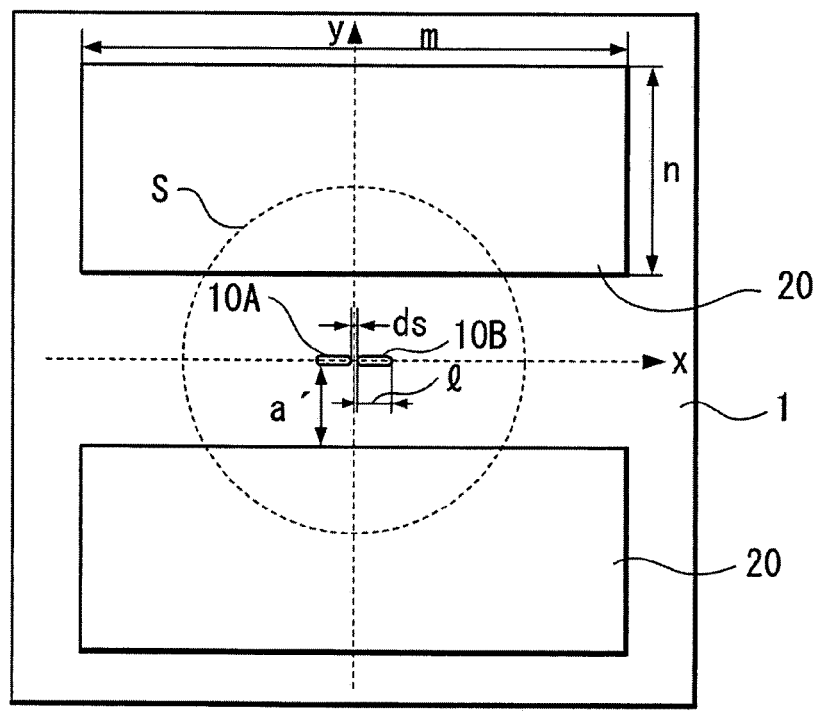
FIG. 23 is a schematic plane view of major parts of another example of the optical near-field generating apparatus according to the embodiment of the invention.

A method has been known in which a second scatterer is arranged in the vicinity of a tip end of a scatterer in which an optical near-field is generated to amplify the intensity of the optical near-field. In the example below, as illustrated in FIG. 23, two scatterers, scatterers 10A and 10B, are arranged on the substrate 1. Each of the scatterers 10A and 10B is formed in a rod-like planar shape, and the width is 24 nm, the length l along the polarizing direction of the incident light is 90 nm, and the thickness is 30 nm. A peak-to-peak distance ds between the scatteres 10A and 10B is 20 nm. The conductive bodies 20 in the shapes similar to those of the example of FIG. 10A and FIG. 10B are arranged for the scatterers 10A and 10B, and the multiplication factor of the intensity of the optical near-field has been calculated while changing a distance a' of the conductive body 20 from the side surface of the scatterer 10 (the surface opposing the conductive body 20). A result of this calculation is illustrated in FIG. 24.

Figure 24:
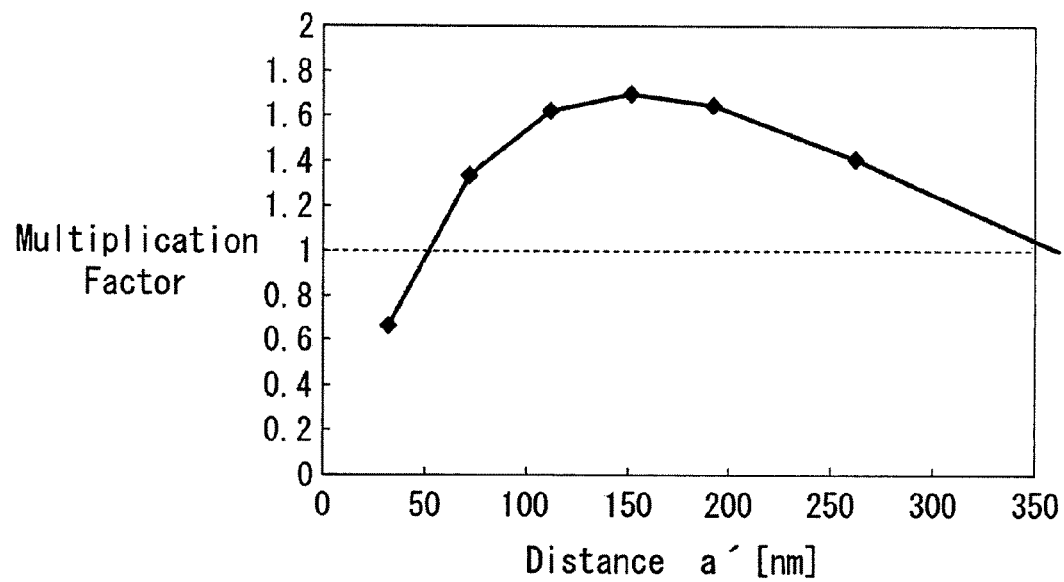
FIG. 24 is a diagram illustrating a change in the multiplication factor of an optical near-field relative to the distance between a conductive body and a scatterer in the optical near-field generating apparatus according to the embodiment of the invention, illustrated in FIG. 23.

From FIG. 24, it is understood that even in the case that two scatterers 10A and 10B are arranged, if the conductive body having the opposing surface nearly parallel to the polarizing direction of the incident light is arranged separated from the scatterers 10A and 10B by a predetermined distance or more, an amplification effect of the intensity of an optical near-field has been obtained.

In the above-described example, the case that two scatterers in the same shape are arranged has been described, however, the shapes of these scatterers may be different from each other, and further, three or more scatterers may be arranged. In this case, the distance to the conductive body may be defined as a distance from the side surface of the scatterer in which the optical near-field to be amplified is generated to the opposing surface of the conductive body opposing this scatterer.

Fourth Embodiment

Next, regarding a case that the scatterer is shaped to have a step, description is made with respect to a result of examining the amplification effect of an optical near-field based on arrangement of a conductive body around a scatterer.

Figure 25A:
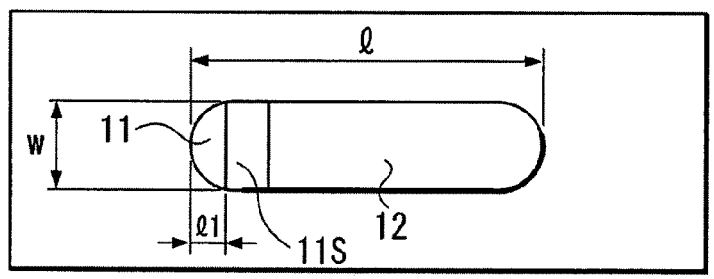
FIG. 25A and FIG. 25B are a schematic plane view and a schematic cross-section view of another example of a scatterer of an optical near-field generating apparatus according to an embodiment of the invention.
Figure 25B:
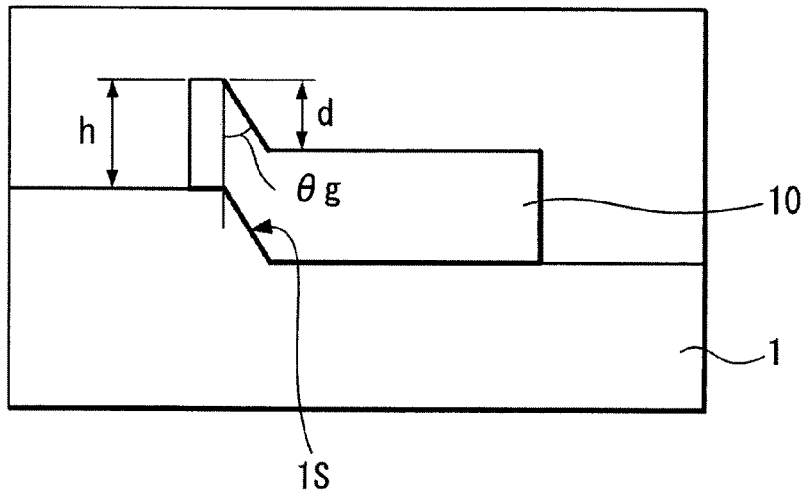

In the example below, as illustrated in a schematic planar view of FIG. 25A and a schematic cross section of FIG. 25B, a step S1 is provided on the substrate 1, and the scatterer 10 in a rod-like shape is formed so as to stride over the step 1S. The surface of the scatterer 10 over a relatively high region of the substrate 1 is denoted as a first region 11, and the surface of the scatterer 10 over a relatively low region of the substrate 1 is denoted as a second region 12. With this configuration, only the first region 11 where an optical near-field is generated is close to an illuminated object to which the optical near-field is illuminated, e.g., an information recording medium, and the second region 12 where an unnecessary optical near-field is generated is relatively separated. Therefore, there is an advantage that it is possible to illuminate the optical near-field with an intended intensity only to a desired place of the information recording medium.

Figure 26A:
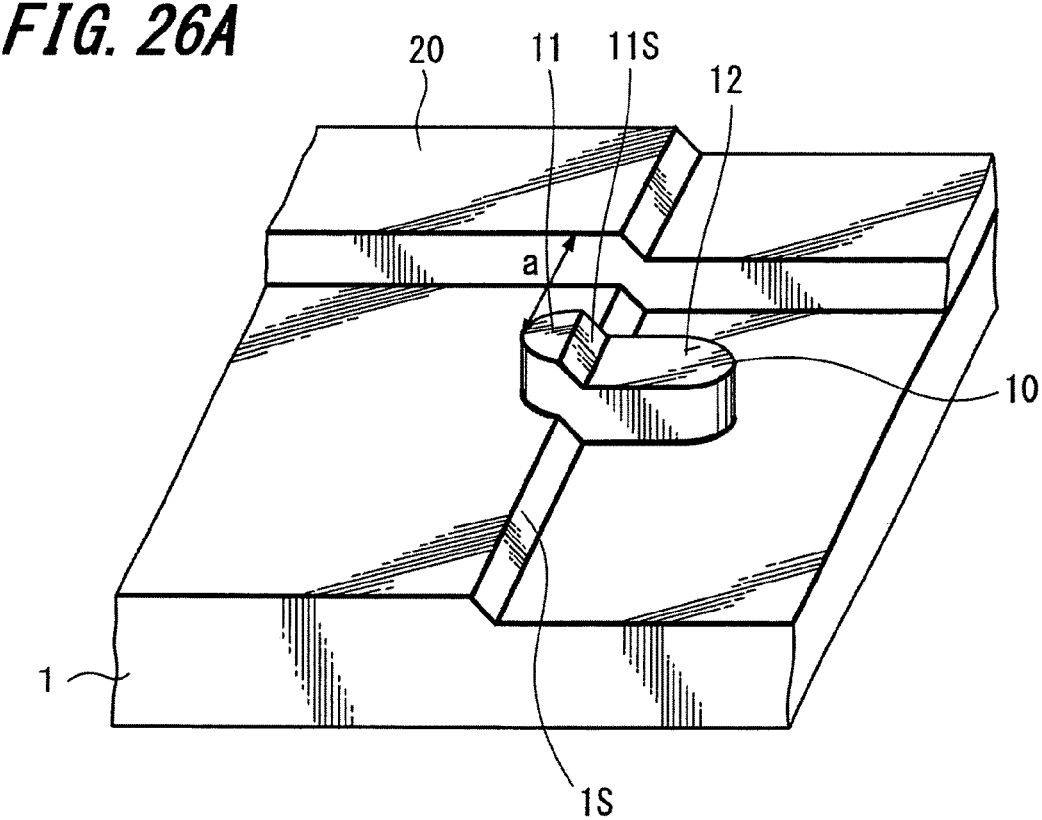
FIG. 26A and FIG. 26B are schematic perspective views of major parts of another examples of an optical near-field generating apparatus according to an embodiment of the invention, using the scatterer illustrated in FIG. 25A and FIG. 25B.
Figure 26B:
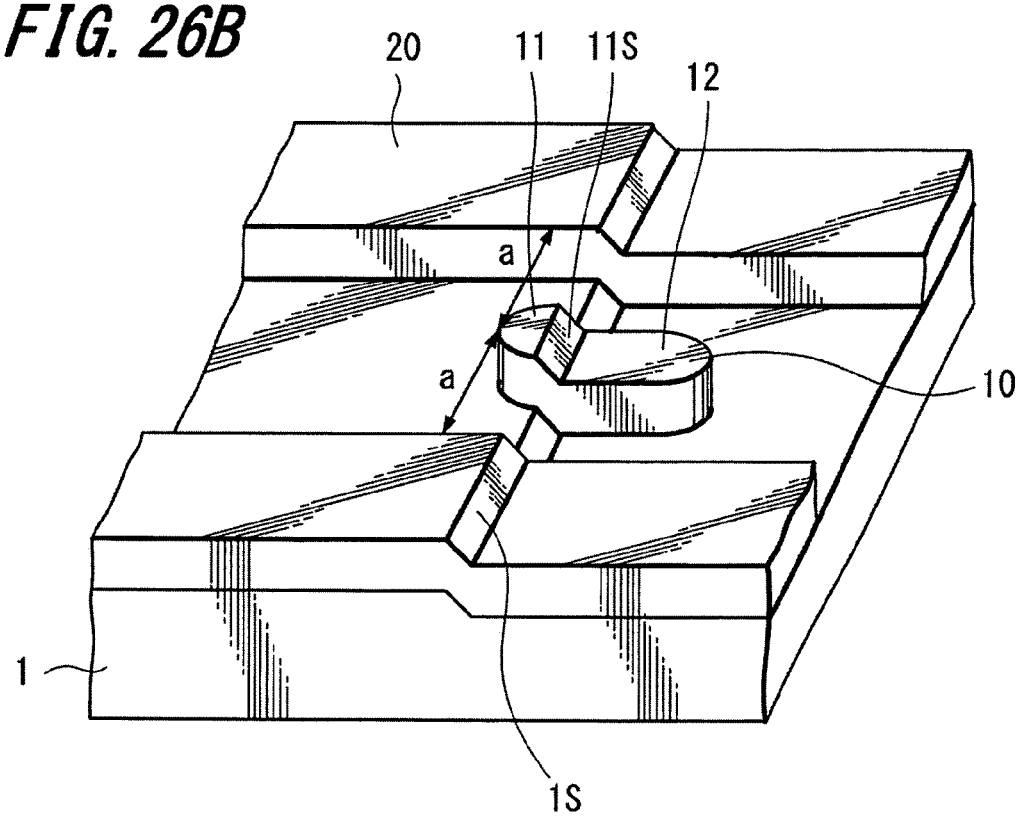

In the example below, the length l of the scatterer 10 in the direction parallel to the polarizing direction of incident light is 100 nm, the width w in the direction perpendicular to the polarizing direction of the incident light is 24 nm, the thickness h is 30 nm, and the length l1 in the direction parallel to the polarizing direction of the incident light in the first region is 10 nm. A difference d between the heights of the first region 11 and the second region 12 generated due to the step S1 is 20 nm. The material of the scatterer 10 is gold, and the material of the substrate 1 is quartz. The conductive body 20 having the same dimension and material configurations as those of the example described with reference to FIG. 10A and FIG. 10B is arranged for the scatterer 10 described above, and a case in which the conductive body 20 is arranged only on one side of the scatterer 10 as illustrated in FIG. 26A and a case in which the conductive body 20 is arranged on both sides of the scatterer 10 as illustrated in FIG. 26B have been examined. In FIG. 26A and FIG. 26B, respective parts corresponding to those in FIG. 25A and FIG. 25B are denoted by the same reference symbols and overlapped description is omitted. Note that the conductive body 20 is also formed to stride over the step S1 and is shaped to have a step similarly. A result of calculating the multiplication factor of an optical near-field in these cases is illustrated in FIG. 27.

Figure 27:
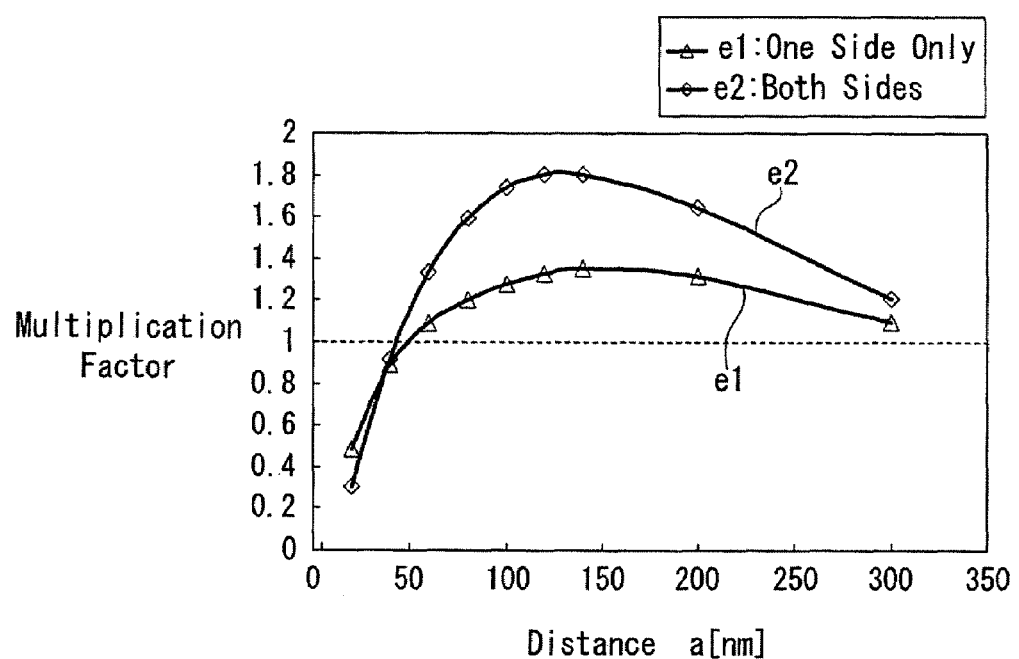
FIG. 27 is a diagram illustrating a change in the multiplication factor of an optical near-field relative to the distance between the conductive body and the scatterer in the examples of the optical near-field generating apparatus according to the embodiment of the invention, illustrated in FIG. 26A and FIG. 26B.

In FIG. 27, a solid line e1 indicates the multiplication factor when the conductive body 20 is arranged only on one side of the scatterer 10 as illustrated in FIG. 26A, and a solid line e2 indicates the multiplication factor when the conductive body 20 is arranged on both sides of the scatterer 10 as illustrated in FIG. 26B. From the result of FIG. 27, it is understood that an amplification effect can be obtained also in the case in which the conductivity body 20 is arranged only on one side of the scatterer 10. However, the multiplication factor is decreased as compared with the case in which the conductivity body 20 is arranged on both sides of the scatterer 10, so that it can be said that it is preferable to arrange the conductivity body 20 on both sides of the scatterer 10.

Fifth Embodiment

As a fifth embodiment, an example is described in which a conductive body is arranged to achieve amplification of the intensity of an optical near-field and also to serve as a coil for generating a magnetic field.

Figure 28:
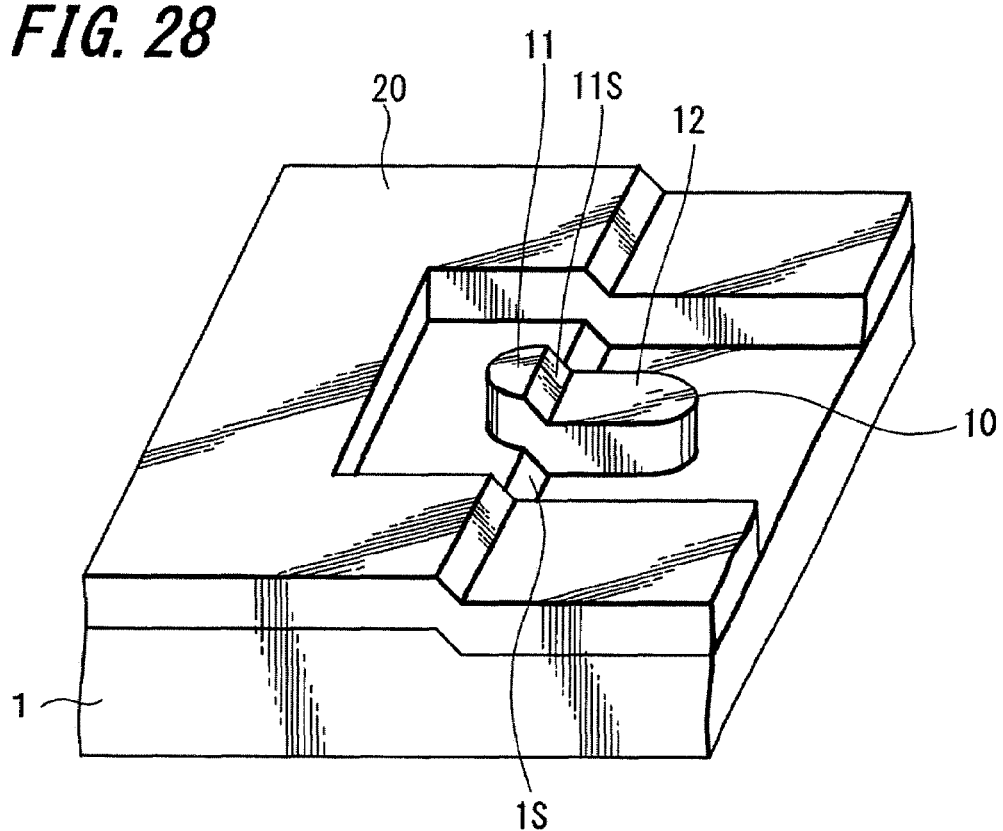
FIG. 28 is a schematic perspective view of major parts of another example of an optical near-field generating apparatus according to an embodiment of the invention.

For example, as illustrated in FIG. 28, the step is is provided on the substrate 1, the scatterer 10 is provided to stride over the step S1, and the conductive body 20 is provided to surround the scatterer 10. In FIG. 28, respective parts corresponding to those in FIG. 25 are denoted by the same reference symbols and overlapped description is omitted.

Figure 29:
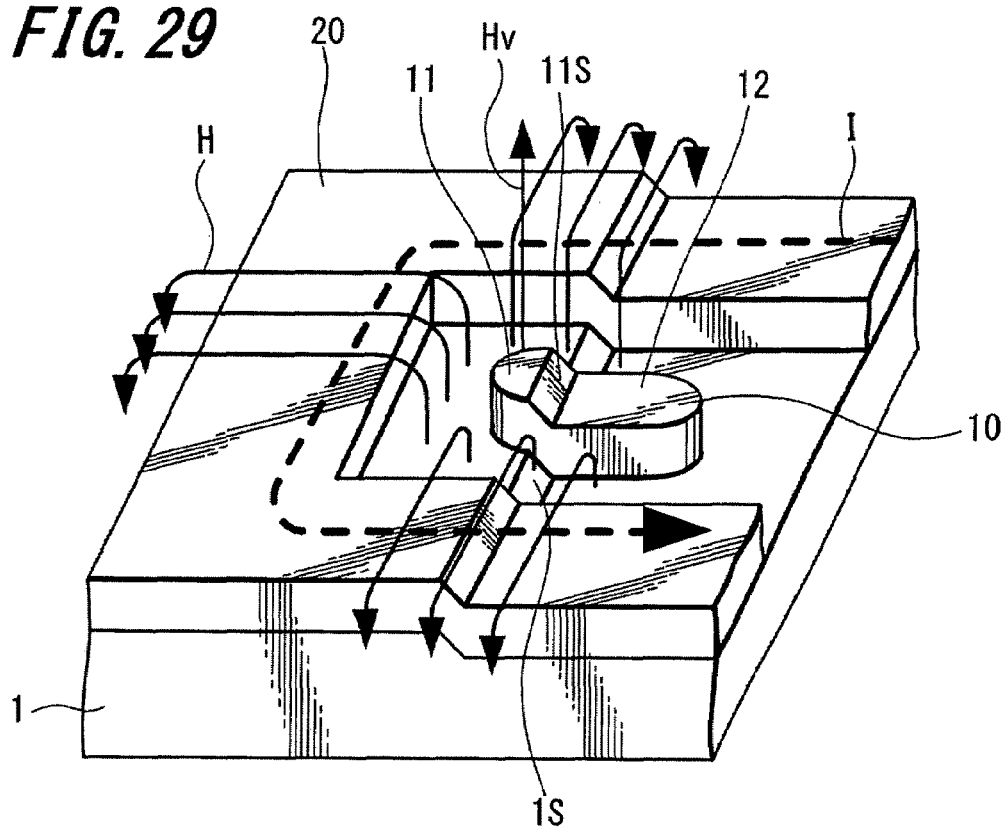
FIG. 29 is another schematic perspective view of the major parts of the example of the optical near-field generating apparatus according to the embodiment of the invention, illustrating a generated magnetic field.

If an electric current is applied to the conductive body 20 configured as described above, as illustrated in FIG. 29, a magnetic field H is generated around the conductive body 20, and in particular, a vertical magnetic field Hv can be generated in the optical near-field generation region, that is, in this case, in the first region 11 of the scatterer 10. In FIG. 29, respective parts corresponding to those in FIG. 28 are denoted by the same reference symbols and overlapped description is omitted. By using an optical near-field generating apparatus having the configuration as described above for an information recording medium, heat assisting magnetic recording is enabled.

In the example illustrated in FIG. 29, one piece of the conductive body 20 is provided to surround the scatterer 10 for generating a magnetic field, however, a plurality of conductive bodies 20 for generating a magnetic field, each serving the similar role, may be provided. When plural conductive bodies 20 are provided, because respective magnetic fields are overlapped with each other, a larger magnetic field can be generated.

Figure 14:
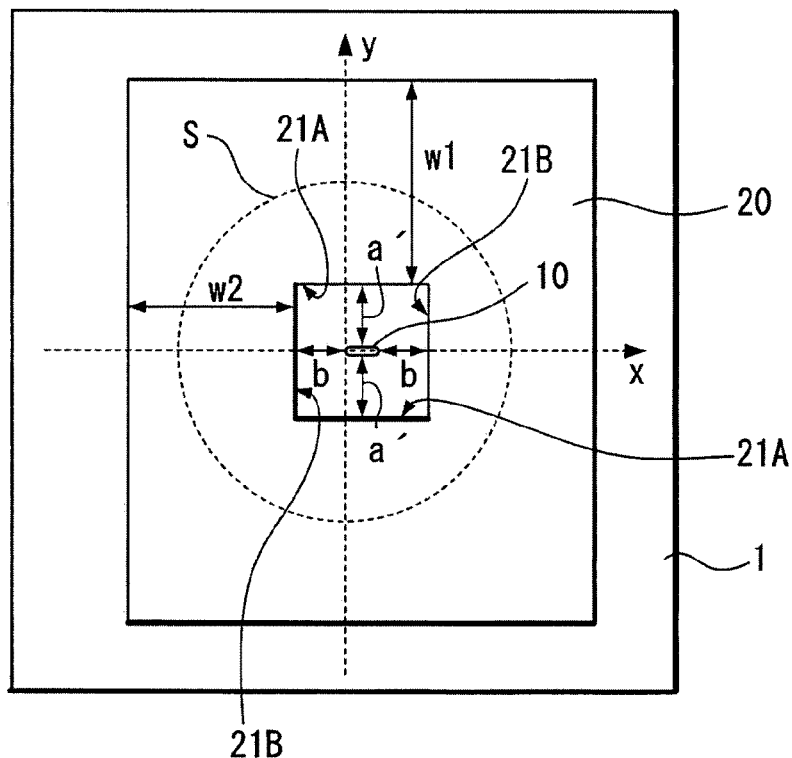
FIG. 14 is a schematic plane view of major parts of another example of the optical near-field generating apparatus according to the embodiment of the invention.

As a shape similar to the one illustrated in FIG. 29, an example in which the conductive body 20 is in the planar configuration described with reference to FIG. 14 has been examined, and the multiplication factor becomes similar to the result illustrated in FIG. 15. As previously described, by making the distance b 100 nm or greater as much as possible, and by selecting the distance a' (a'=a+w/2) to be in a certain range, a relatively large multiplication factor can be obtained.

Figure 30:
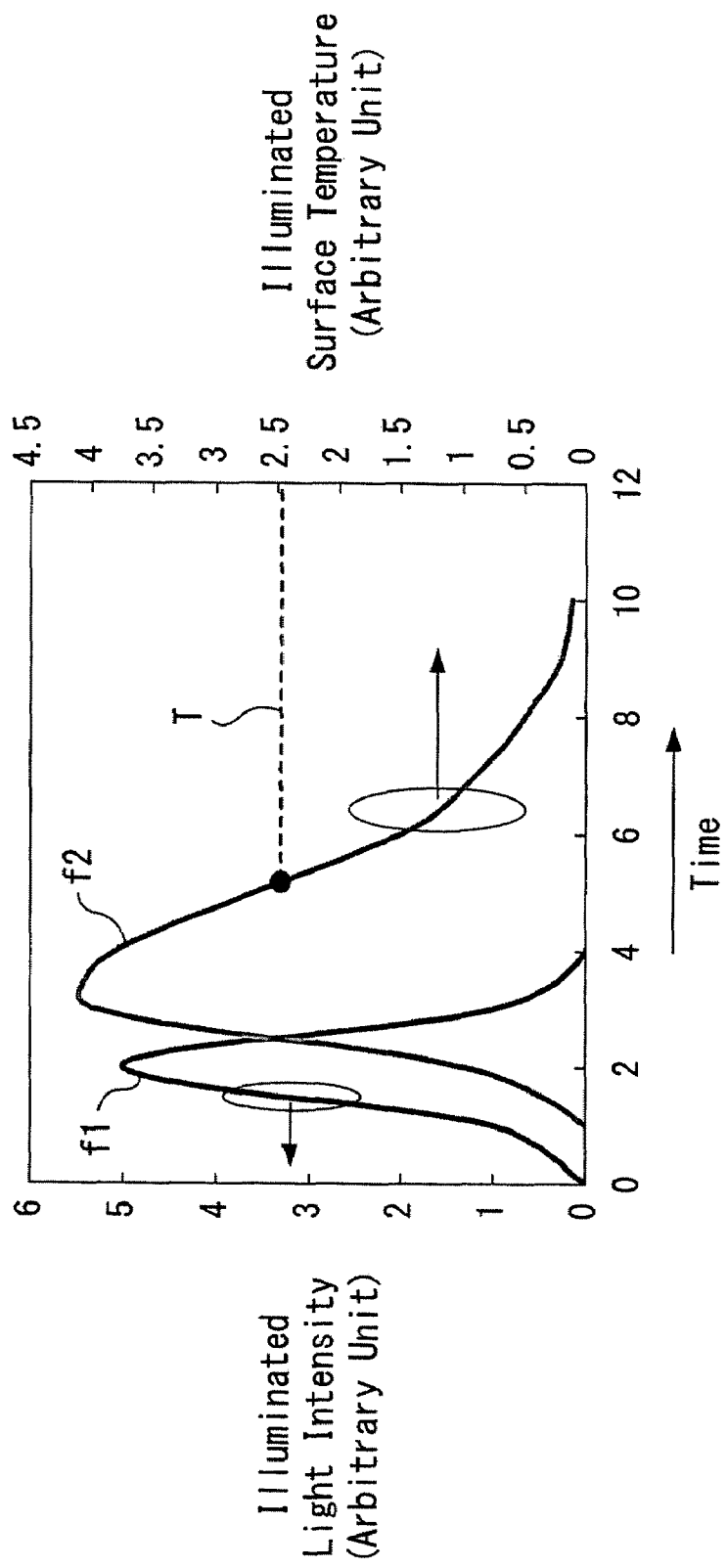
FIG. 30 is a diagram illustrating a time distribution of an illuminating light intensity on an illuminated object and an illuminated surface temperature.

Note that when carrying out heat assisting recording to an information recording medium, to cause a desired temperature rise in a place of the recording medium to which an optical near-field is illuminated, a time delay is caused. Accordingly, it is preferable that the peak position of the intensity of an optical near-field and the peak position of the intensity of an applied magnetic field are deviated from each other to a certain extent. FIG. 30 schematically illustrates such a state. In FIG. 30, the horizontal axis indicates time t, a solid line f1 indicates the intensity of an illuminating light, and a solid line f2 indicates the temperature of an illuminated surface. It is understood that respective peak positions are deviated from each other. A distance deviation caused by this time delay can be estimated to be about 10 nm to 100 nm depending on the conditions such as the recording density of the information recording medium, the linear velocity in recording and/or reproducing, etc.

When providing a conductive body around a scatterer in the optical near-field generating apparatus according to an embodiment of the invention, as apparent from the above-described examples, it is possible to arrange the scatterer and the conductive body such that the position the magnetic field intensity peak position and the optical near-field intensity peak position is deviated by a distance in a range from 10 nm to 100 nm.

Accordingly, it can be said that amplification of an optical near-field and generation of a magnetic field suitable for recording and/or reproducing of an information recording medium can be carried out.

In all of the above-described examples of the embodiments, a scatterer and a conductive body are formed on the surface of an optically transparent substrate, however, parts or the whole of the scatterer and the conductive body may be embedded in the optically transparent substrate.

Further, the scatterer and the conductive body may be formed at a condensing point of a light condensing element, at an end of an optical waveguide, in the vicinity of a resonator, in the vicinity of an emerging surface of a semiconductor laser, or in the vicinity of a light reception surface of an optical detector. With such a configuration, it becomes possible to efficiently illuminate a light having a desired light intensity to a scatterer, and by integrating respective parts, it becomes possible to simplify optical adjusting operations.

Sixth Embodiment

Figure 31:
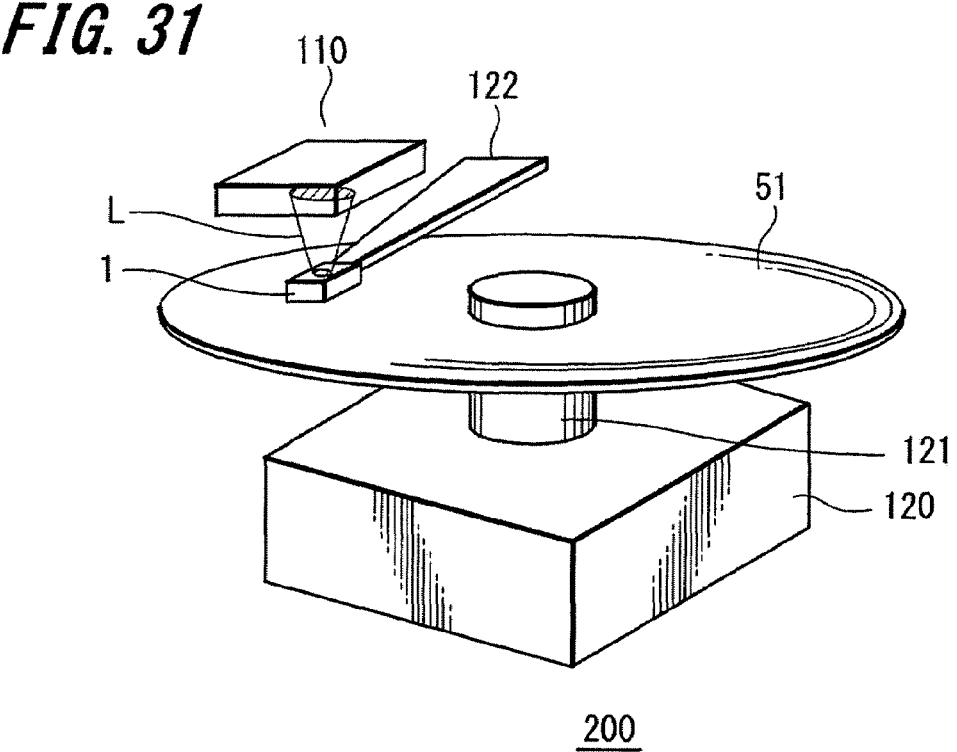
FIG. 31 is a schematic perspective view of an example of an information recording/reproducing apparatus according to an embodiment of the invention.

Next, description is made with respect to an example of an information recording/reproducing apparatus in which the optical near-field generating apparatus according to an embodiment of the invention has been applied. FIG. 31 is a schematic perspective view of an example of an information recording/reproducing apparatus according to an embodiment of the invention. As illustrated in FIG. 31, an information recording/reproducing apparatus 200 includes a substrate 1 in which a scatterer and a conductive body are provided to oppose an information recording medium 51, and an optical system 110 having a light source and having the function of guiding an emerging light L from the light source to the scatterer and the conductive body provided around the scatterer. The shapes of the scatterer and the conductive body and their arrangement can be the same as those described with respect to any one of the above-described examples.

In the example illustrated in FIG. 31, the information recording medium 51 is for example in a disk shape, and is set on a not-shown placement table on a rotation drive unit 120 to be rotated at a high speed around a rotation axis 121. The substrate 1, on which the scatterer is provided, is formed for example in a slider-like shape so as to move at a high speed relative to the information recording medium 51 while keeping a gap between the information recording medium 51 and the optical near-field generating place of the scatterer at several 10 nm or less, and is mounted to a suspension 122. The substrate 1 is caused by an elastic force of the suspension 122 to oppose the information recording medium 51 with a desired minute gap on the side of the recording medium 51. The suspension 12 is supported within the information recording/reproducing apparatus 200. The emerging light L from the light source is caused by the optical system 110 to be incident to the scatterer from the rear side of the substrate 1 opposite the side where the scatterer is provided.

Figure 32:
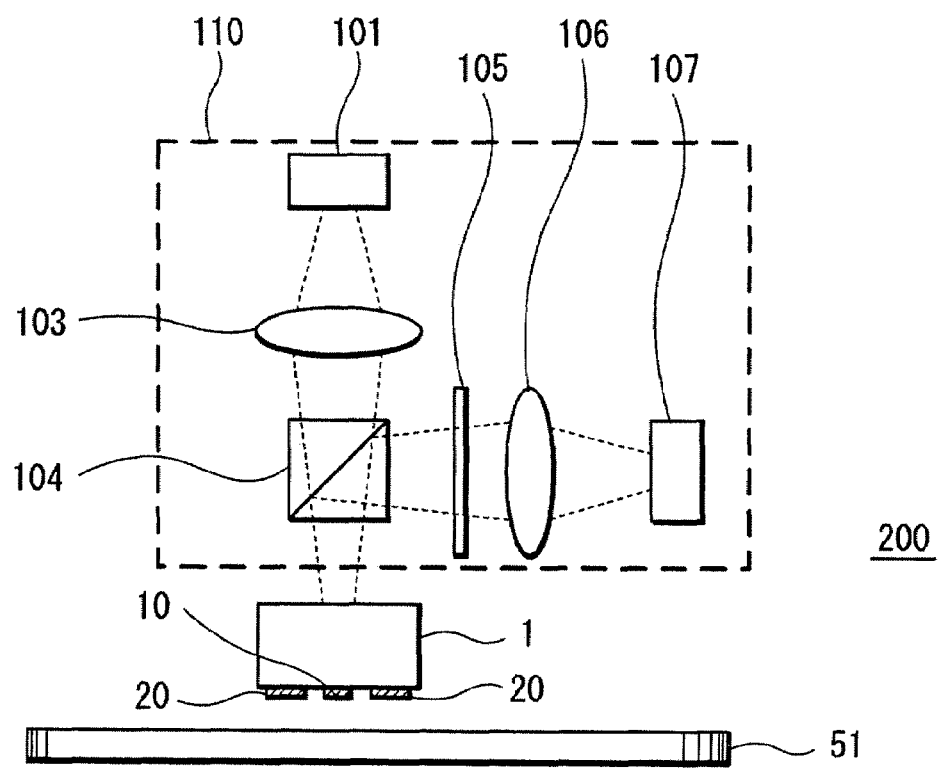
FIG. 32 is a schematic perspective view of an example of an optical system of the information recording/reproducing apparatus according to the embodiment of the invention.

A schematic configuration diagram of an example of the optical system 110 is illustrated in FIG. 32. In the example illustrated in FIG. 32, a condensing element 103 such as a condensing lens, etc. and a beam splitter 104 are arranged on a light path of an emerging light of a light source 101. A polarizer 105, a condensing element 106, and a light reception unit 107 are arranged in this order on a light path of a reflected light of the beam splitter 104. A light emitted from the light source 101 is condensed by the condensing element 103, passes the beam splitter 104, and is illuminated to at least parts of the scatterer 10 and the conductive body 20 of the substrate 1, thereby causing a surface plasmon to be excited and illuminating an optical near-field onto a predetermined region, that is, onto a predetermined place of a recording track, of the information recording medium 51. A light reflected from the information recording medium 51 is reflected at the beam splitter 104, passes the polarizer 105 for example, and is condensed by the condensing element 106 on the light reception unit 107 to be detected. Note that the optical system 110 may be integrally formed with the substrate 1 to be mounted to the suspension 122 illustrated in FIG. 31 together with the substrate 1.

While using an optical magnetic recording medium for the information recording medium 51, by carrying out illumination of an optical near-field using a scatterer of an information recording/reproducing apparatus according to an embodiment of the invention and further by changing the direction of magnetization of a magnetic recording film of the recording medium with application of a magnetic field using a magnetic field generation unit, a recording mark can be formed. Reproduction is carried out by detecting the change in the intensity of a light returning from the information recording medium 51 with the light reception unit 10 of the optical system 110 illustrated in FIG. 32. That is, because the ratio that the optical near-field is scattered by the information recording medium 51 changes depending on existence or non-existence of the recording mark, reproduction is carried out by detecting the change in the intensity of the scattered light. In the optical system 110 illustrated in FIG. 32, a signal light from the information recording medium 51 is separated from the incident light by the beam splitter 104, and is detected by the light reception unit 107 after passing the polarizer 105 and the condensing element 106. Here, when the polarizing direction of a signal light from the information recording medium 51 is different from the polarizing direction of the incident light, as illustrated in FIG. 32, the polarizer 105 is placed in the light path to make the polarizing direction of the polarizer 106 perpendicular to the polarizing direction of the incident light, and thereby contrast can be increased.

In the above-described information recording/reproducing apparatus 200, the information recording medium 51 is not limited to the optical magnetic recording medium, and a magnetic recording medium may be used. Also, a phase-change medium, a pigment medium, etc. may be used.

Further, in the information recording/reproducing apparatus according to an embodiment of the invention, a magnetic reproduction head dedicated for reproduction may be separately provided. By using a magnetic reproduction head, optical parts for light detection in the above-described optical system 110 become unnecessary, so that the apparatus can be made compact. Furthermore, it is possible to configure the apparatus as an information recording apparatus dedicated for recording.

As described above, according to the optical near-field generating apparatus, the optical near-field generating method, and the information recording and reproducing apparatus according to embodiments of the invention, the following effects are obtained.

1. Because the change in the multiplication factor relative to the distance between the scatterer and the conductive body is gentle, and the tolerable range is broad with respect to the arrangement accuracy of the conductive body, as compared with a case that the intensity of the optical near-field is amplified by devising the shape of the scatterer, it is possible to easily manufacture the optical near-field generating apparatus while having a tolerance considerably larger than the accuracy in the shape of the scatterer, so that it becomes possible to easily amplify the optical near-field.

2. Similarly, because the size of the conductive body having the opposing surface forming an angle not greater than 45° relative to the polarizing direction of an illuminated light only has to be greater than a certain size, and the tolerable range of the accuracy in the shape thereof is relatively broad, it can be manufactured easily as compared with a case that the shape of the scatterer has to be devised, and it becomes possible to easily amplify the intensity of the optical near-field.

That is, it can be said that according to the invention, without complicating the shape configuration of the scatterer itself to complicate the manufacture thereof, by arranging the conductive body under an appropriate condition, the intensity of the optical near-field can be easily and surely increased.

3. The amplification effect of the optical near-field can be obtained with respect to the scatterers of various shapes, and also the amplification effect of the optical near-field can be similarly obtained in the optical near-field generating apparatus, the optical near-field generating method, and the information recording/reproducing apparatus, that use plural scatterers, and further the optical near-field generating apparatus having a high light use efficiency can be obtained.

4. Because the degree of freedom in the shape of the conductive body having the amplification effect is high, it is possible to cause the conductive body to bear the role of a magnetic field generation means, so that it is advantageous in integrating functions.

5. When generating a magnetic field in the vicinity of the scatterer with the conductive body, the magnetic field can be generated in the whole region surrounded by the conductive body. Therefore, it is unnecessary to optimize the relative position of the optical near-field generation place and the magnetic field generation place, that is, it is unnecessary to carry out minute positioning, so that manufacture can be simplified.

It should be understood by those skilled in the art that various modifications, combinations, sub-combinations, and alterations may occur depending on design requirements and other factors insofar as they are within the scope of the appended claims or the equivalents thereof. Further, the invention can be applied not only to an information recording apparatus but also to an application apparatus using a optical near-field, and for example can be applied to a near-field optical microscope, a near-field exposure apparatus, etc.

What is claimed is:

1. An optical near-field generating apparatus comprising:
   a conductive scatterer causing an optical near-field based on a surface plasmon to be generated by being illuminated by incident light; and
   a conductive body arranged in a vicinity of the scatterer and generating a surface plasmon by being illuminated by the incident light and by being influenced by the surface plasmon of the scatterer, wherein
   an oscillation direction of the surface plasmon of the conductive body is approximately parallel to an oscillation direction of the surface plasmon of the scatterer, and wherein
   a generation region of the surface plasmon of the conductive body exists in a position deviated from a region extending in an oscillation direction of the surface plasmon of the scatterer.

2. The optical near-field generating apparatus according to claim 1, wherein
   the scatterer and the conductive body are arranged on a surface on one side of an optically transparent substrate, and the incident light is illuminated to the scatterer and the conductive body through the substrate.

3. The optical near-field generating apparatus according to claim 1, wherein
   the conductive body includes an edge portion forming an angle not exceeding 45° relative to a polarizing direction of the illuminated incident light.

4. The optical near-field generating apparatus according to claim 1, wherein
   when a length of the scatterer in a direction parallel to a polarizing direction of the incident light is l and a length of a surface opposing the scatterer of the conductive body in the direction parallel to the polarizing direction of the incident light is m, $m \geq 1.5 \cdot l$ is satisfied.

5. The optical near-field generating apparatus according to claim 1, wherein
   when an average width of the conductive body in a direction perpendicular to a polarizing direction of the incident light is n, $n \geq 0.4 \cdot l$ is satisfied.

6. The optical near-field generating apparatus according to claim 1, wherein
   in an opposing surface of the conductive body opposing the scatterer and forming an angle between 0° and 45° relative to a polarizing direction of the incident light, when a distance from an optical near-field peak intensity position on the scatterer is a, $0.7 \cdot l \leq a \leq 3 \cdot l$ is satisfied.

7. The optical near-field generating apparatus according to claim 1, wherein in an opposing surface of the conductive body opposing the scatterer and forming an angle greater than 45° but not exceeding 90° relative to a polarizing direction of the incident light, when a distance from an optical near-field peak intensity position on the scatterer is b, b≧l is satisfied.

8. The optical near-field generating apparatus according to claim 1, wherein an optical spot shape of the incident light illuminated to the scatterer and the conductive body is approximately circle, and wherein when a distance of an opposing surface of the conductive body forming an angle between 0° and 45° relative to a polarizing direction of the incident light from an optical near-field peak intensity position on the scatterer is a and a distance of an opposing surface of the conductive body forming an angle greater than 45° but not exceeding 90° relative to the polarizing direction of the incident light from the optical near-field peak intensity position on the scatterer is b, a≦b is satisfied.

9. The optical near-field generating apparatus according to claim 1, wherein an optical spot shape of the incident light illuminated to the scatterer and the conductive body is other than a perfect circle, and wherein when an average light intensity of the incident light in an opposing surface of the conductive body forming an angle between 0° and 45° relative to a polarizing direction of the incident light is Ia1 and an average light intensity of the incident light in an opposing surface of the conductive body forming an angle greater than 45° but not exceeding 90° relative to the polarizing direction of the incident light is Ia2, Ia1≧Ia2 is satisfied.

10. The optical near-field generating apparatus according to claim 1, wherein by applying an electric current to the conductive body, a magnetic field is generated in a place of the scatterer where the optical near-field is generated.

11. An optical near-field generation method comprising the steps of:

arranging a scatterer causing an optical near-field based on a surface plasmon to be generated by being illuminated by incident light and a conductive body having an edge portion that is approximately parallel to a polarizing direction of the incident light illuminated to the scatterer such that the edge portion of the conductive body is approximately parallel to the polarizing direction of the incident light and is in a position deviated from a region extending in an oscillation direction of the surface plasmon on the scatterer; and causing a surface plasmon to be generated along the edge portion of the conductive body to amplify an intensity of the optical near-field generated in the scatterer as compared with a case that the conductive body is not arranged.

12. An information recording and reproducing apparatus comprising:

a light source;

a scatterer opposing an information recording medium; and an optical system guiding an emerging light from the light source to the scatterer, wherein an optical near-field generated from the scatterer is illuminated to a predetermined place of the information recording medium to carry out recording and/or reproducing, wherein a conductive body generating a surface plasmon by being illuminated by incident light and by being influenced by a surface plasmon of the scatterer is arranged in a vicinity of the scatterer, wherein an oscillation direction of the surface plasmon of the conductive body is approximately parallel to an oscillation direction of the surface plasmon of the scatterer, and wherein a generation region of the surface plasmon of the conductive body exists in a position deviated from a region extending in an oscillation direction of the surface plasmon of the scatterer.

13. The information recording and reproducing apparatus according to claim 12, wherein the scatterer and the conductive body are arranged on a surface on one side of an optically transparent substrate, and the incident light is illuminated to the scatterer and the conductive body through the substrate.

14. The information recording and reproducing apparatus according to claim 12, wherein the conductive body includes an edge portion forming an angle not exceeding 45° relative to a polarizing direction of the incident light.

15. The information recording and reproducing apparatus according to claim 12, wherein when a length of the scatterer in a direction parallel to a polarizing direction of the incident light is l and a length of a surface opposing the scatterer of the conductive body in a direction parallel to the polarizing direction of the incident light is m, m≧1.5·l is satisfied.

16. The information recording and reproducing apparatus according to claim 12, wherein when an average width of the conductive body in a direction perpendicular to a polarizing direction of the incident light is n, n≧0.4·l is satisfied.

17. The information recording and reproducing apparatus according to claim 12, wherein in an opposing surface of the conductive body opposing the scatterer and forming an angle between 0° and 45° relative to a polarizing direction of the incident light, when a distance from an optical near-field peak intensity position on the scatterer is a, 0.7·l≦a≦3·l is satisfied.

18. The information recording and reproducing apparatus according to claim 12, wherein in an opposing surface of the conductive body opposing the scatterer and forming an angle greater than 45° but not exceeding 90° relative to a polarizing direction of the incident light, when a distance from an optical near-field peak intensity position on the scatterer is b, b≧l is satisfied.

19. The information recording and reproducing apparatus according to claim 12, wherein an optical spot shape of the incident light illuminated to the scatterer and the conductive body is approximately circle, and wherein when a distance of an opposing surface of the conductive body forming an angle between 0° to 45° relative to a polarizing direction of the incident light from an optical near-field peak intensity position on the scatterer is a and a distance of an opposing surface of the conductive body forming an angle greater than 45° but not exceeding 90° relative to the polarizing direction of the incident light from the optical near-field peak intensity position on the scatterer is b, $a \leq b$ is satisfied.

20. The information recording and reproducing apparatus according to claim 12, wherein an optical spot shape of the incident light incident to the scatterer and the conductive body is other than a perfect circle, and wherein when an average light intensity of the incident light in an opposing surface of the conductive body forming an angle between 0° and 45° relative to a polarizing direction of the incident light is Ia1 and an average light intensity of the incident light in an opposing surface of the conductive body forming an angle greater than 45° but not exceeding 90° relative to the polarizing direction of the incident light is Ia2, $Ia1 \geq Ia2$ is satisfied.

21. The information recording and reproducing apparatus according to claim 12, wherein by applying an electric current to the conductive body, a magnetic field is generated in a place of the scatterer where the optical near-field is generated.

* * * * *